US012579286B2

(12) United States Patent
Deonarine et al.

(10) Patent No.: US 12,579,286 B2
(45) Date of Patent: Mar. 17, 2026

(54) SECURE LCS COMMUNICATION SYSTEM

(71) Applicant: Dell Products L.P., Round Rock, TX (US)

(72) Inventors: Jonathan Deonarine, Cedar Park, TX (US); Shyamkumar T. Iyer, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 18/761,535

(22) Filed: Jul. 2, 2024

(65) Prior Publication Data
US 2026/0010643 A1    Jan. 8, 2026

(51) Int. Cl.
G06F 21/60        (2013.01)

(52) U.S. Cl.
CPC .................................. G06F 21/606 (2013.01)

(58) Field of Classification Search
CPC ...................................................... G06F 21/606
See application file for complete search history.

(56) References Cited

U.S. PATENT DOCUMENTS

| | | | |
|---|---|---|---|
| 11,044,238 B2 | 6/2021 | Yang et al. | |
| 2020/0127981 A1* | 4/2020 | Yang ..................... | H04L 63/068 |
| 2023/0394001 A1* | 12/2023 | Mundt .................. | G06F 13/385 |
| 2023/0401100 A1* | 12/2023 | Gowda .................. | G06F 9/5011 |
| 2023/0401107 A1* | 12/2023 | Gowda .................. | G06F 9/547 |

* cited by examiner

*Primary Examiner* — Bradley W Holder
(74) *Attorney, Agent, or Firm* — Joseph Mencher

(57) ABSTRACT

A secure LCS communication system includes a first host processing system that is configured to provide a first LCS, a second host processing system that is configured to provide a second LCS, and an SCP device that is connected to the first host processing system and that is coupled to the second host processing system via a network. The SCP device uses first keys associated with the first LCS to configure a first secure communication channel with the first host processing system, and uses second keys associated with the first LCS and the second LCS to configure a second secure communication channel with the second host processing system via the network. When the SCP device receives a communication from the first LCS via the first secure communication channel that is directed to the second LCS, it transmits the communication via the second secure communication channel to the second LCS.

20 Claims, 17 Drawing Sheets

302

RESOURCE
MANAGEMENT
SYSTEM
304

RESOURCE
SYSTEM
306a

RESOURCE
SYSTEM
306b

RESOURCE
SYSTEM
306c

LCS PROVISIONING SUBSYSTEM 300

402

SCP
DEVICE
406

RESOURCE
DEVICE
404a

RESOURCE
DEVICE
404b

RESOURCE
DEVICE
404c

RESOURCE SYSTEM 400

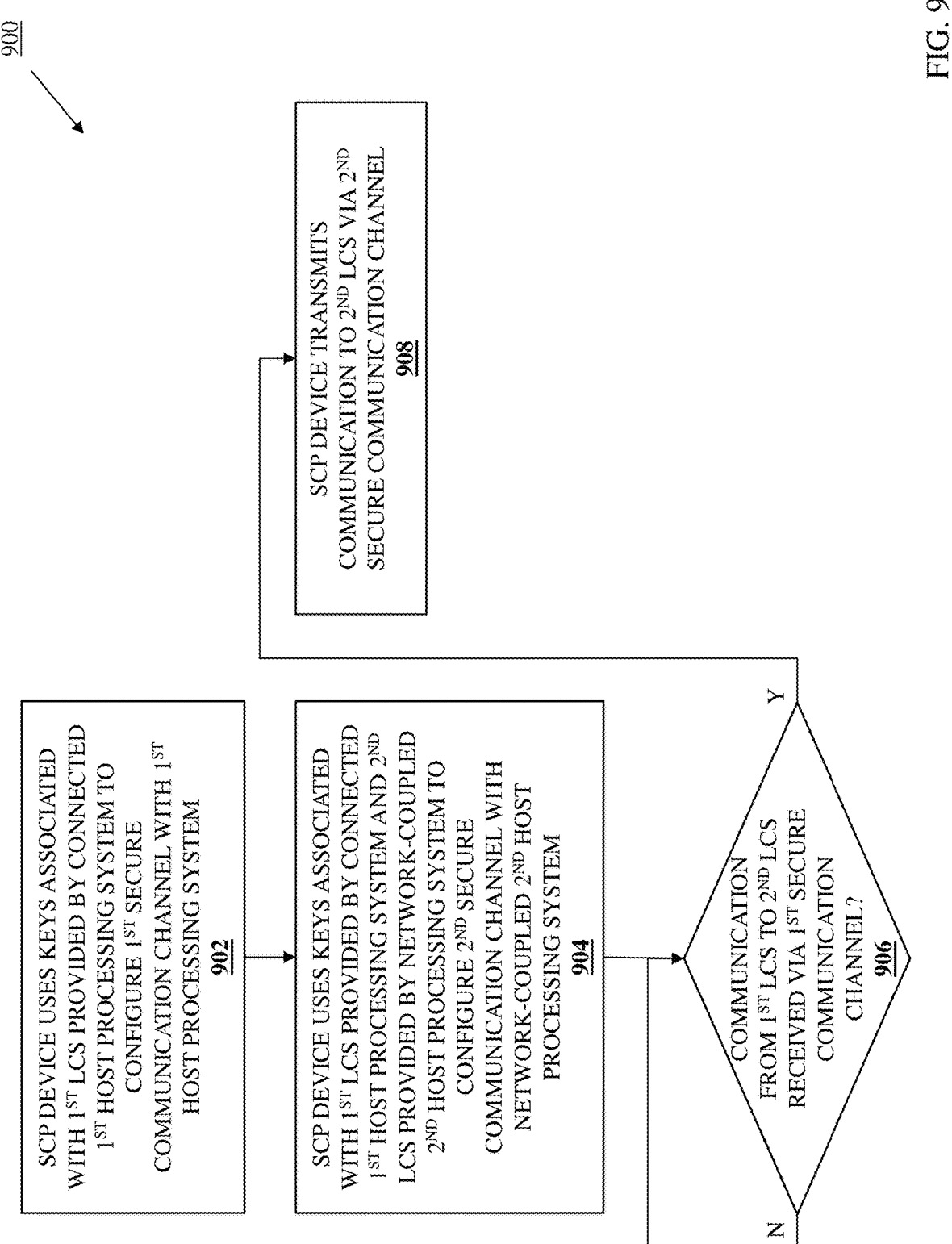

900

SCP DEVICE USES KEYS ASSOCIATED WITH 1ST LCS PROVIDED BY CONNECTED 1ST HOST PROCESSING SYSTEM TO CONFIGURE 1ST SECURE COMMUNICATION CHANNEL WITH 1ST HOST PROCESSING SYSTEM
902

SCP DEVICE USES KEYS ASSOCIATED WITH 1ST LCS PROVIDED BY CONNECTED 1ST HOST PROCESSING SYSTEM AND 2ND LCS PROVIDED BY NETWORK-COUPLED 2ND HOST PROCESSING SYSTEM TO CONFIGURE 2ND SECURE COMMUNICATION CHANNEL WITH NETWORK-COUPLED 2ND HOST PROCESSING SYSTEM
904

COMMUNICATION FROM 1ST LCS TO 2ND LCS RECEIVED VIA 1ST SECURE COMMUNICATION CHANNEL?
906

N

Y

SCP DEVICE TRANSMITS COMMUNICATION TO 2ND LCS VIA 2ND SECURE COMMUNICATION CHANNEL
908

LCS 708

HOST PCIE 722a

SCP PCIE 722b

SCP FPGA 706b

SCP ETH 722d

NETWORK 710

NIC 806

HOST CPU 804

LCS 808

IDE CHANNEL 1102

IPSEC CHANNEL 1106

1300

SECURE LCS COMMUNICATION SYSTEM

BACKGROUND

The present disclosure relates generally to information handling systems, and more particularly to providing secure communications between LCS(s) that are provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As discussed in further detail below, information handling systems such as, for example, server devices and/or other resource systems known in the art, may include resource devices that are used to provide Logically Composed Systems (LCSs) that perform workloads for users (also referred to as "tenants" below). Furthermore, multi-tenant LCS environments may allow one or more LCSs to be provided for each of a plurality of different tenants, and may include providing LCS(s) for a single tenant that are distributed across multiple resources systems, as well as a single resource system providing LCSs for multiple tenants. However, such multi-tenant LCS environments raise security issues with regard to communications between LCS(s) (e.g., between LCS(s) provided by the same resource system, between LCS(s) provided by different resource systems, etc.), and conventional LCS communication security techniques are limited to the securing of communication over an Internet Protocol (IP) network, require changes to a runtime environment of the LCSs, and degrade the performance of the LCSs with which they are used.

Accordingly, it would be desirable to provide a secure LCS communication system that addresses the issues discussed above.

SUMMARY

According to one embodiment, an Information Handling System (IHS) includes a System Control Processor (SCP) processing system; and an SCP memory system that is coupled to the SCP processing system and that includes instructions that, when executed by the SCP processing system, cause the SCP processing system to provide an SCP engine that is configured to: configure, using first keys associated with a first LCS that is provided by a first host processing system connected to the SCP processing system, a first secure communication channel with the first host processing system; configure, using second keys associated with the first LCS and a second LCS that is provided by a second host processing system coupled to the SCP processing system via a network, a second secure communication channel with the second host processing system via the network; receive, from the first LCS via the first secure communication channel, a communication directed to the second LCS; and transmit the communication via the second secure communication channel to the second LCS.

BRIEF DESCRIPTION OF THE DRAWINGS

FIG. 9 is a flow chart illustrating an embodiment of a method for providing secure LCS communications.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
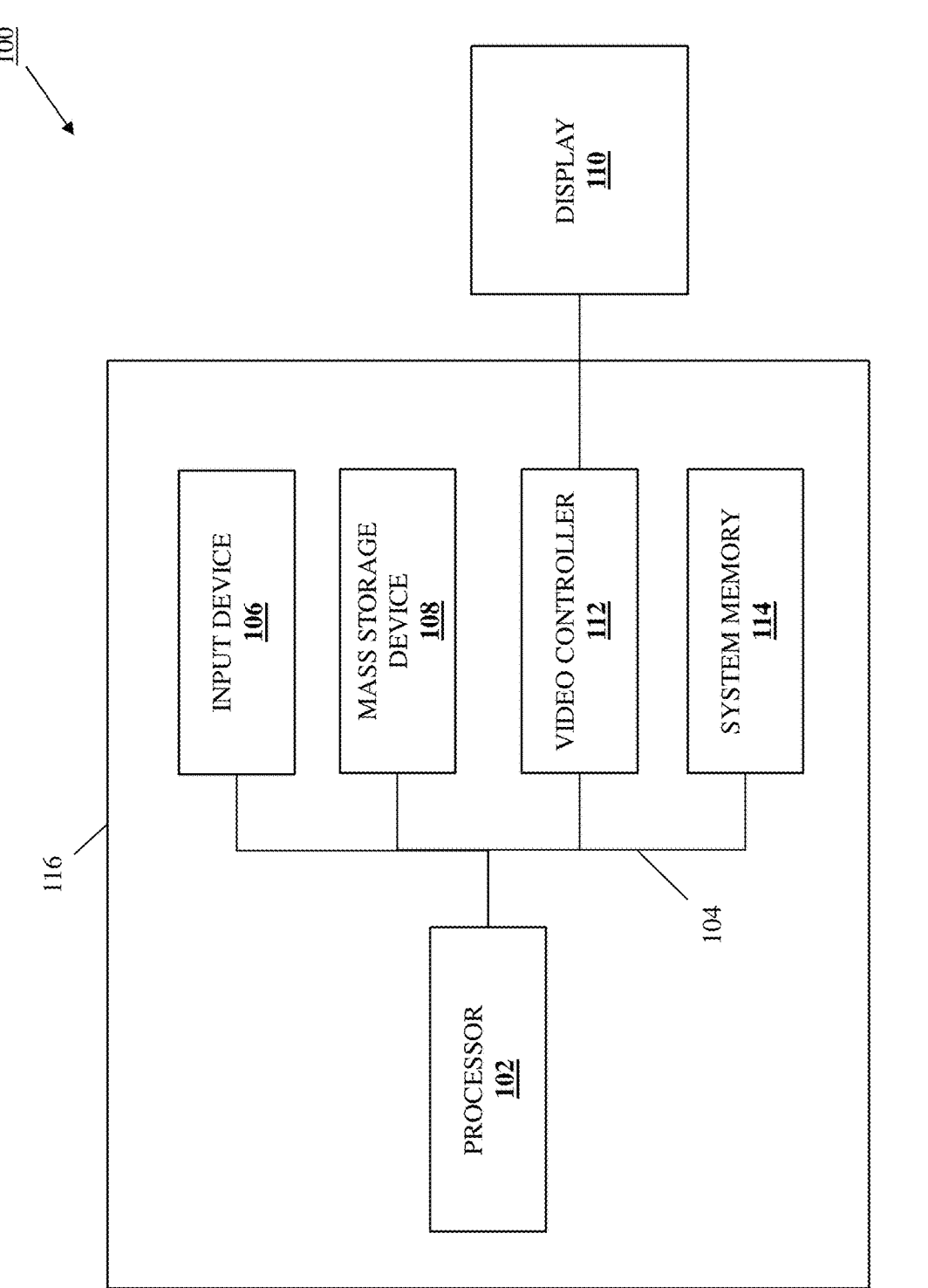
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the secure Logically Composed System (LCS) communication systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
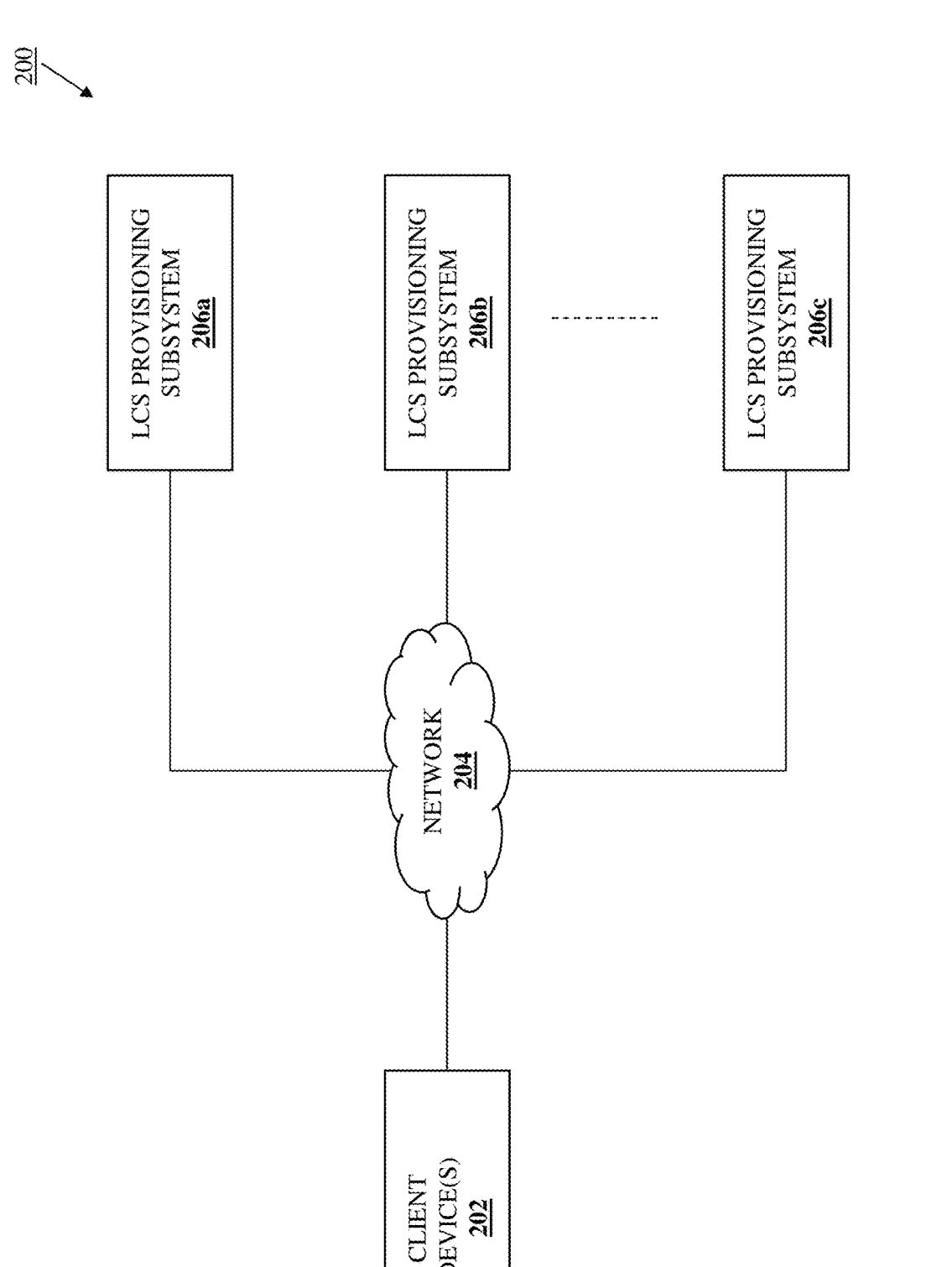
FIG. 2 is a schematic view illustrating an embodiment of an LCS provisioning system.

With reference to FIG. 2, an embodiment of an LCS provisioning system 200 is illustrated that may be utilized with the secure LCS communication systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306*a*, 306*b*, and up to 306*c*. In an embodiment, any of the resource management system 304 and the resource systems 306*a*-306*c* may be provided by the IHS 100 discussed above with reference to FIG. 1 and/or may include some or all of the components of the IHS 100. In the specific embodiments provided below, each of the resource management system 304 and the resource systems 306*a*-306*c* may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306*a*-306*c* may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306*a*-306*c*, and that performs the functionality of the resource management system 304 described below. In some examples, the resource management system 304 may be provided by a "stand-alone" system (e.g., that is provided in a separate chassis from each of the resource systems 306*a*-306*c*), and the SCPM subsystem discussed below may be provided by a dedicated SCP device, processing/memory resources, and/or other components in that resource management system 304. However, in other embodiments, the resource management system 304 may be provided by one of the resource systems 306*a*-306*c* (e.g., it may be provided in a chassis of one of the resource systems 306*a*-306*c*), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306*a*-306*c* in other embodiments. Furthermore, one of skill in the art in possession of the present disclosure will appreciate how SCP devices in the resource systems 306*a*-306*c* may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306*a*-306*c* discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404*a*, 404*b*, and up to 404*c*, each of which is coupled to the SCP device 406. For example, the resource devices 404*a*-404*c* may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404*a*-404*c* discussed below. As such, the resource devices 404*a*-404*c* in the resource systems 306*a*-306*c*/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
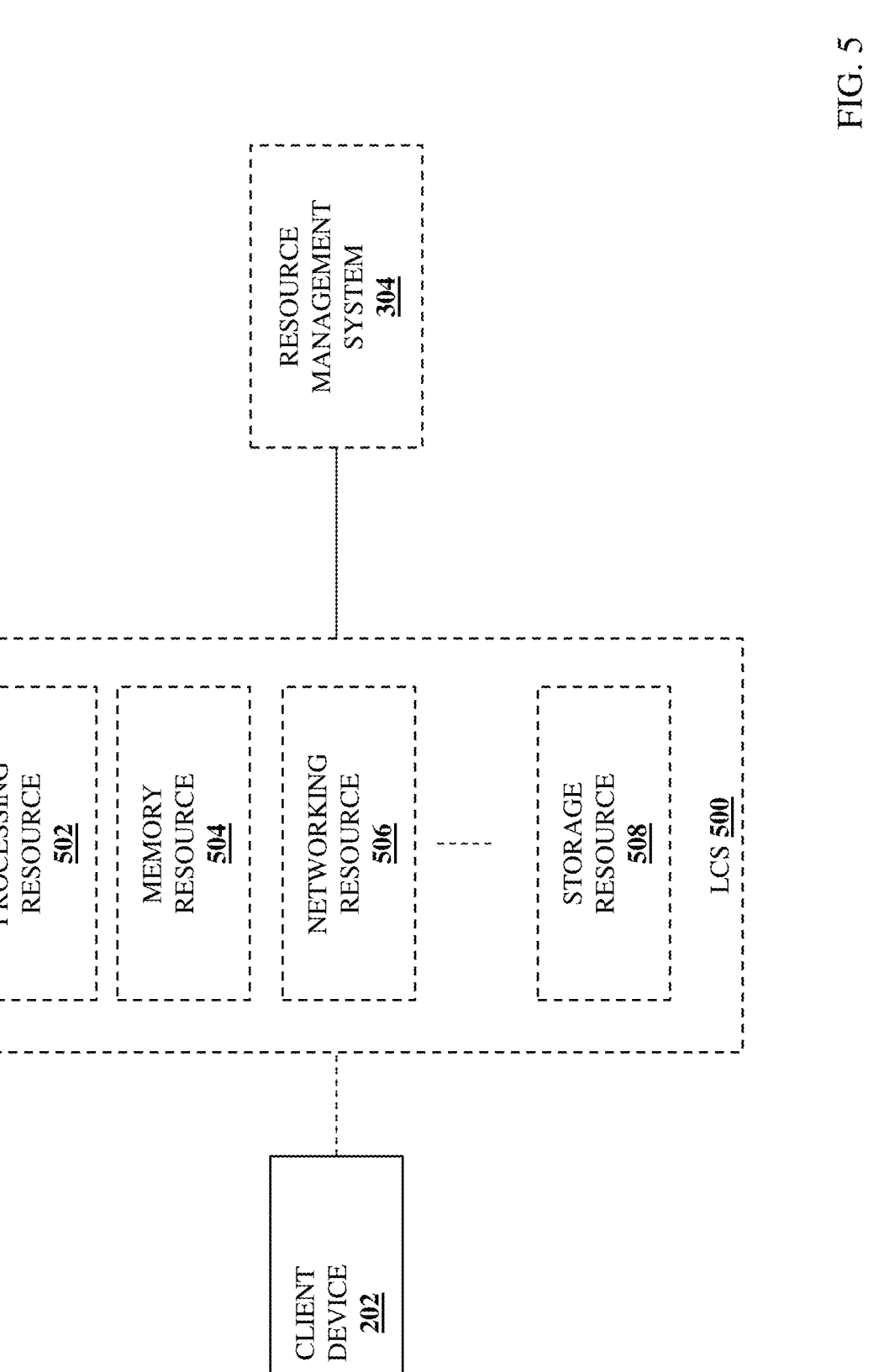
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protectedobject-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/ devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
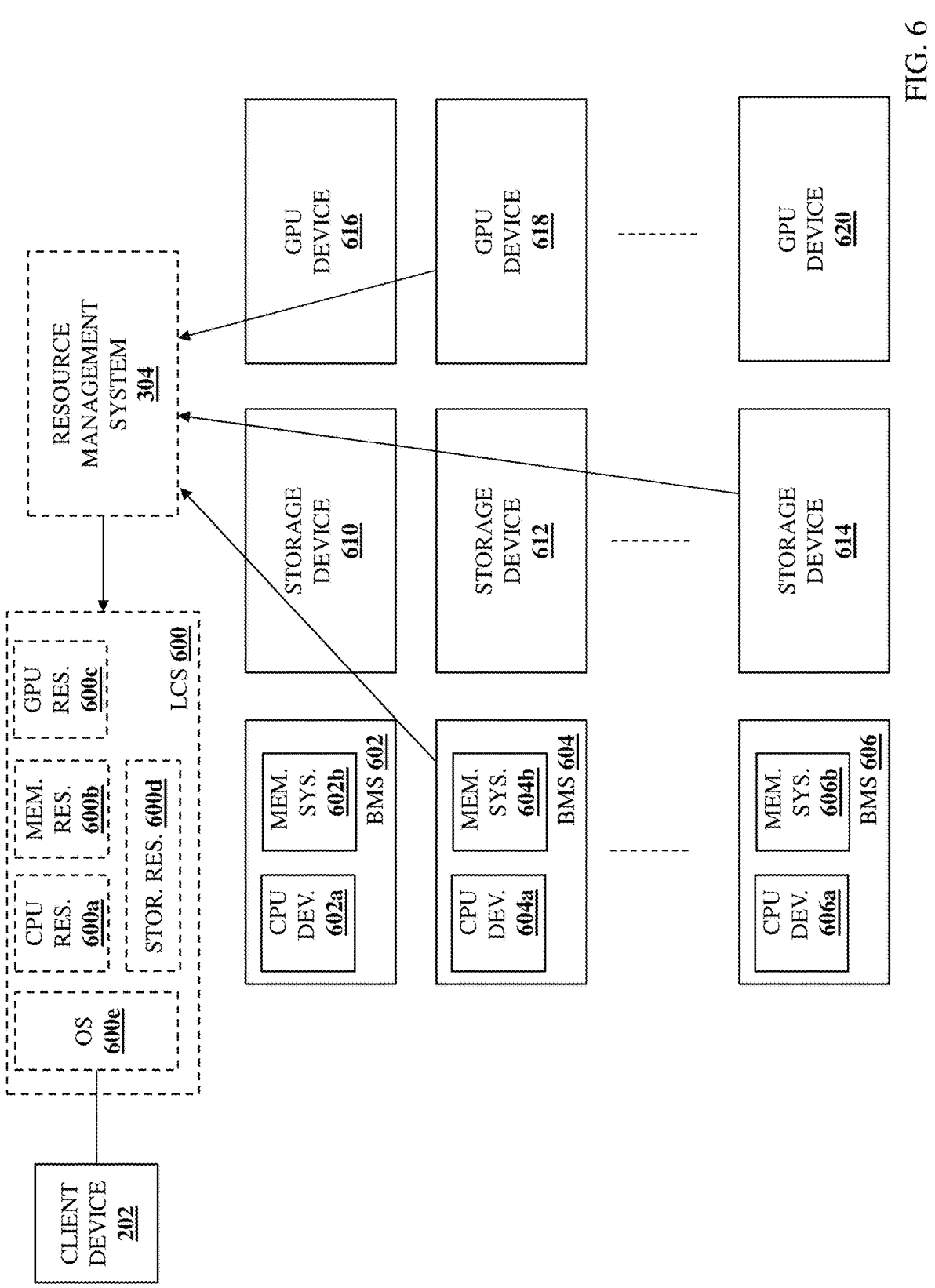
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614.

Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600c utilizing the GPU device 618 to provide the GPU resources 600c in the LCS 600, and utilizing the storage device 614 to provide the storage resources 600d in the LCS 600. The user of the client device 202 may then provide any application(s) on the operating system 600c provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
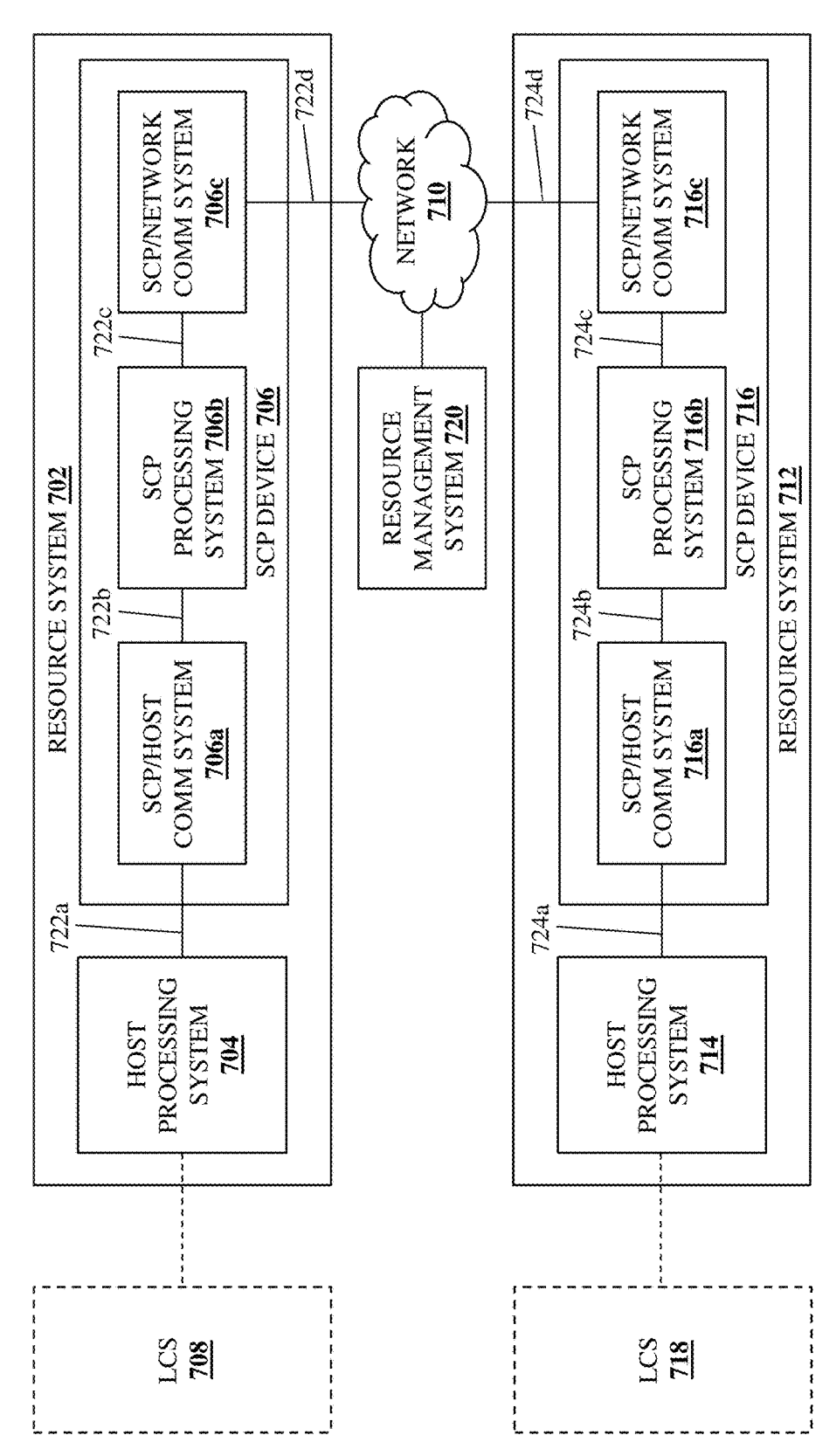
FIG. 7 is a schematic view illustrating an embodiment of a networked system that may provide the secure LCS communication system of the present disclosure.

Referring now to FIG. 7, an embodiment of a networked system 700 is illustrated that may provide the secure LCS communication system of the present disclosure. In the illustrated embodiment, the networked system 700 may be provided using the LCS provisioning system 200 described above with reference to FIG. 2 and the LCS provisioning subsystem described above with reference to FIG. 3, and may operate similarly as described with reference to FIGS. 5 and 6. In the illustrated embodiment, the networked system 700 includes a resource system 702 that may be provided by any of the resource systems 306*a*, 306*b*, and up to 306*c* described above with reference to FIG. 3 and the resource system 400 described above with reference to FIG. 4. In the specific examples provided below, the resource system 702 includes a host processing system 704 (e.g., one of the resource devices 404*a*-404*c* discussed above with reference to FIG. 4) that is coupled to an SCP device 706 (e.g., the SCP device 406 discussed above with reference to FIG. 4) and that operates to provide an LCS 708, and one of skill in the art in possession of the present disclosure will appreciate how the LCS 708 may be provided by any of a variety of resource devices in addition to the host processing system 704 similarly as described above.

As illustrated, the SCP device 706 may include an SCP/ host communication system 706*a* that is coupled to the host processing system 704 by a host/SCP connection 722*a* that is described below as being provided by a Peripheral Component Interconnect express (PCIe) connection, but that one of skill in the art in possession of the present disclosure will appreciate may be provided by other host/SCP connections known in the art. The SCP device 706 also includes an SCP processing system 706*b* that is coupled to the SCP/host communication system 706*a* by an internal SCP connection 722*b* that is described below as being provided by a PCIe connection, but that one of skill in the art in possession of the present disclosure will appreciate may be provided by other internal SCP connections known in the art (e.g., an intra-device logic-to-logic fabric connection such as those provided using an Advanced extensible Interface (AXI) interface). The SCP device 706 also includes an SCP/ network communication system 706*c* that is coupled to the SCP processing system 706*b* by an internal SCP connection 722*c* that is described below as being provided by a PCIe connection, but that one of skill in the art in possession of the present disclosure will appreciate may be provided by other internal SCP connections known in the art (e.g., an intra-device logic-to-logic fabric connection such as those provided using an AXI interface).

To provide a specific example, the SCP processing system 706*b* may be configured (e.g., with rules, instructions, and/or other information) to provide an Open virtual Switch (OvS) subsystem that operates to provide at least some of the functionality described below with the communications received via the SCP/host communication subsystem 706*a* and transmitted via the SCP/network communication system 706*c*, although one of skill in the art in possession of the present disclosure will appreciate how the functionality described below may be enabled in a variety of manners that will fall within the scope of the present disclosure as well.

As illustrated, the resource system 702 is coupled to a network 710 that may be provided by a Local Area Network (LAN), the Internet, combinations thereof, and/or any other network that would be apparent to one of skill in the art in possession of the present disclosure. In the embodiments illustrated and described below, the SCP/network communication system 706*c* is coupled to the network 710 by network connection 722*d* that is described below as being provided by an Ethernet connection, but that one of skill in the art in possession of the present disclosure will appreciate may be provided by other network connections known in the art Furthermore, the networked system 700 also includes a resource system 712 that may be provided by any of the resource systems 306*a*, 306*b*, and up to 306*c* described above with reference to FIG. 3 and the resource system 400 described above with reference to FIG. 4. In the specific examples provided below, the resource system 712 includes a host processing system 714 (e.g., one of the resource devices 404*a*-404*c* discussed above with reference to FIG. 4) that is coupled to an SCP device 716 (e.g., the SCP device 406 discussed above with reference to FIG. 4) and that operates to provide an LCS 718, and one of skill in the art in possession of the present disclosure will appreciate how the LCS 718 may be provided by any of a variety of resource devices in addition to the host processing system 714 similarly as described above.

As illustrated, the SCP device 716 may include an SCP/ host communication system 716*a* that is coupled to the host processing system 714 by a host/SCP connection 724*a* that is described below as being provided by a PCIe connection, but that one of skill in the art in possession of the present disclosure will appreciate may be provided by other host/ SCP connections known in the art. The SCP device 716 also includes an SCP processing system 716*b* that is coupled to the SCP/host communication system 716*a* by an internal SCP connection 724*b* that is described below as being provided by a PCIe connection, but that one of skill in the art in possession of the present disclosure will appreciate may be provided by other internal SCP connections known in the art (e.g., an intra-device logic-to-logic fabric connection such as those provided using an AXI interface). The SCP device 716 also includes an SCP/network communication system 716c that is coupled to the SCP processing system 716b by an internal SCP connection 724c that is described below as being provided by a PCIe connection, but that one of skill in the art in possession of the present disclosure will appreciate may be provided by other internal SCP connections known in the art (e.g., an intra-device logic-to-logic fabric connection such as those provided using an AXI interface).

As illustrated, the resource system 712 is also coupled to the network 710. In the embodiments illustrated and described below, the SCP/network communication system 716c is coupled to the network 710 by network connection 724d that is described below as being provided by an Ethernet connection, but that one of skill in the art in possession of the present disclosure will appreciate may be provided by other network connections known in the art.

Similarly as described above, the SCP processing system 716b may be configured (e.g., with rules, instructions, and/or other information) to provide an OvS subsystem that operates to provide at least some of the functionality described below with the communications received via the SCP/host communication subsystem 716a and transmitted via the SCP/network communication system 716c, although one of skill in the art in possession of the present disclosure will appreciate how the functionality described below may be enabled in a variety of manners that will fall within the scope of the present disclosure as well.

The networked system 700 in the embodiments illustrated and described below also includes a resource management system 720 that is coupled to the network 710 and that may be provided by the resource management system 304 of FIGS. 3, 5, and/or 6. As such, one of skill in the art in possession of the present disclosure will appreciate how the resource management system 720 may have configured the SCP device 706, the host processing system 704, and/or any other resource devices to provide the LCS 708 substantially as described above, and may have configured the SCP device 716, the host processing system 714, and/or any other resource devices to provide the LCS 718 substantially as described above. However, while a specific networked system 700 has been illustrated and described, one of skill in the art in possession of the present disclosure will recognize that networked systems providing the secure LCS communication system of the present disclosure may include a variety of components and/or component configurations for providing conventional networked system functionality, as well as the secure LCS communication functionality discussed below, while remaining within the scope of the present disclosure as well.

Figure 8:
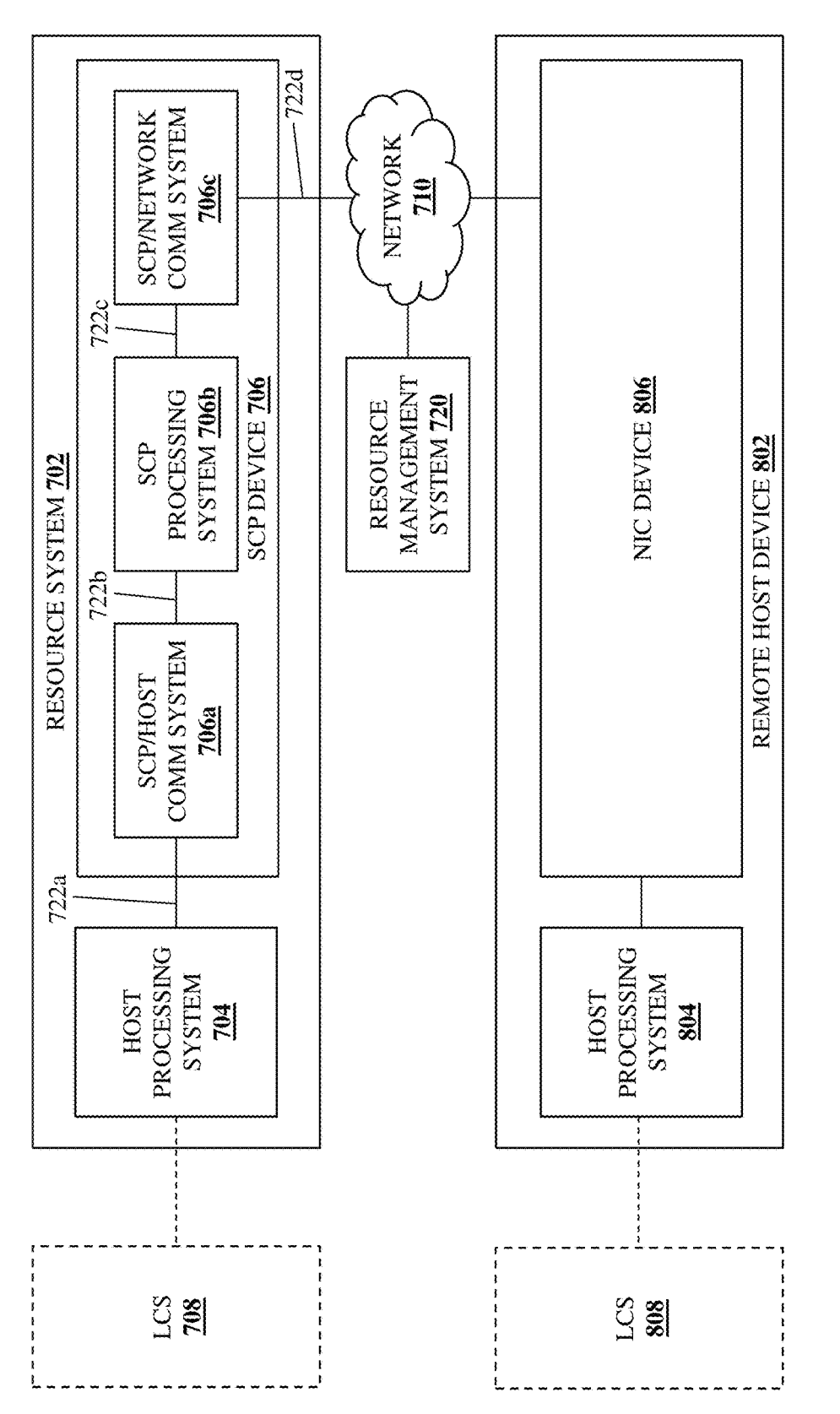
FIG. 8 is a schematic view illustrating an embodiment of a networked system that may provide the secure LCS communication system of the present disclosure.

Referring now to FIG. 8, an embodiment of a networked system 800 is illustrated that may provide the secure LCS communication system of the present disclosure. As will be appreciated by one of skill in the art in possession of the present disclosure, the networked system 800 is similar to the networked system 700 discussed above with reference to FIG. 7, with similar elements having the same element numbers, but with the resource system 712 and LCS 718 omitted. As described below, the resource system 702 may be configured to provide some of the secure LCS communication benefits of the present disclosure with remote host devices that do not include SCP devices or the SCP functionality discussed below, and the embodiment illustrated and discussed with reference to FIG. 8 below provides a specific example of such partial secure LCS communication benefits.

In the illustrated embodiment, the networked system 800 includes a remote host device 802 that includes a host processing system 804 that is coupled to a Network Interface Controller (NIC) device 806 and that operates to provide an LCS 808, and one of skill in the art in possession of the present disclosure will appreciate how the LCS 808 may be provided by any of a variety of resource devices in addition to the host processing system 804 similarly as described above. In some embodiments (e.g., when the remote host device 802 lacks an SCP device like the SCP device 716 included in the resource system 712, and IPSEC must be terminated in software rather than hardware), the NIC device 806 may be configured as an IPSEC appliance (e.g., a Virtual Private Network (VPN) tunnel may be configured between the resource system 702 and the NIC device 806 operating as a VPN appliance) in order to enable the functionality described below, while in other embodiments the host processing system 804 may be configured to provide an IPSEC endpoint emulation application that emulates an IPSEC endpoint in order to enable the functionality described below. However, while a few specific examples have been provided, one of skill in the art in possession of the present disclosure will appreciate how the secure LCS communication functionality of the networked system 800 may be enabled in a variety of manners that will fall within the scope of the present disclosure as well.

Referring now to FIG. 9, an embodiment of a method 900 for providing secure LCS communications is illustrated. As discussed below, the systems and methods of the present disclosure provide for the configuration of respective secure communication channels between an SCP device and each of a connected first host processing system that provides a first LCS and a network-coupled second host processing system that provides a second LCS. For example, the secure LCS communication system of the present disclosure may include a first host processing system that is configured to provide a first LCS, a second host processing system that is configured to provide a second LCS, and an SCP device that is connected to the first host processing system and that is coupled to the second host processing system via a network. The SCP device uses first keys associated with the first LCS to configure a first secure communication channel with the first host processing system, and uses second keys associated with the first LCS and the second LCS to configure a second secure communication channel with the second host processing system via the network. When the SCP device receives a communication from the first LCS via the first secure communication channel that is directed to the second LCS, it transmits the communication via the second secure communication channel to the second LCS. As such, secure LCS communications are enabled between the respective LCSs provided by the connected first host processing system and the network-coupled second host processing system.

The method 900 begins at block 902 where an SCP device uses keys associated with a first LCS provided by a connected first host processing system to configure a first secure communication channel with the first host processing system. In an embodiment, during or prior to block 902, the resource management system 720 may operate to configure the host processing system 704 and the SCP device 706 in the resource system 702 to provide the LCS 708, and the LCS 708 may be associated with keys (e.g., public/private key pairs), certificates, and/or other security information (referred to as "keys" herein). For example, a tenant or other user of the LCS 708 may configure a security policy (e.g., a default security policy in many cases) for the LCS 708 that specifies keys for use in encrypting and/or otherwise securing communications by the LCS 708.

In another example, the resource management system 720 may include an External Key Management System (EKMS) that is configured for use by the resource management system 720 to generate, store, and/or otherwise provide keys for the LCS 708. However, while the resource management system 720 is described as using an EKMS it provides, one of skill in the art in possession of the present disclosure will appreciate how the resource management system 720 may use an EKMS provided by (or pointed to) by a user in order to generate, store, and/or otherwise provide keys for the LCS 708. In a related example, a tenant or other user of the LCS 708 may provide their own keys for the LCS 708 rather than use keys provided by the EKMS included on the resource management system 720. As such, as part of the configuration of the host processing system 704 and the SCP device 706 to provide the LCS 708, the resource management system 720 may provide the keys associated with the LCS 708 to the SCP device 706 (as well as to the SCP device 716 or the host processing system 804 in some embodiments). Furthermore, while several examples have been provided, one of skill in the art in possession of the present disclosure will appreciate how the LCS 708 may be associated with keys in a variety of manners that will fall within the scope of the present disclosure.

Similarly, during or prior to block 902, the resource management system 720 may operate to configure the host processing system 714 and the SCP device 716 in the resource system 712 to provide the LCS 718, and the LCS 718 may be associated with keys (e.g., public/private key pairs), certificates, and/or other security information (referred to as "keys" herein). As such, a tenant or other user of the LCS 718 may configure a security policy (e.g., a default security policy in many cases) for the LCS 718 that specifies keys for use in encrypting and/or otherwise securing communications by the LCS 718. Furthermore, the resource management system 720 may include an EKMS that is configured for use by the resource management system 720 to generate, store, and/or otherwise provide keys for the LCS 718. However, while the resource management system 720 is described as using an EKMS it provides, one of skill in the art in possession of the present disclosure will appreciate how the resource management system 720 may use an EKMS provided by (or pointed to) by a user in order to generate, store, and/or otherwise provide keys for the LCS 708. In a related example, a tenant or other user of the LCS 718 may provide their own keys for the LCS 718 rather than use the keys provided by the EKMS included on the resource management system 720. As such, as part of the configuration of the host processing system 714 and the SCP device 716 to provide the LCS 718, the resource management system 720 may provide the keys associated with the LCS 718 to the SCP device 716 (as well as to the SCP device 706 or the host processing system 804 in some embodiments). Furthermore, while several examples have been provided, one of skill in the art in possession of the present disclosure will appreciate how the LCS 718 may be associated with keys in a variety of manners that will fall within the scope of the present disclosure.

Similarly, during or prior to block 902, the resource management system 720 may operate to configure the host processing system 804 in the remote host device 802 to provide the LCS 808, and the LCS 808 may be associated with keys (e.g., public/private key pairs), certificates, and/or other security information (referred to as "keys" herein). As such, a tenant or other user of the LCS 808 may configure a security policy (e.g., a default security policy in many cases) for the LCS 808 that specifies keys for use in encrypting and/or otherwise securing communications by the LCS 808. Furthermore, the resource management system 720 may include an EKMS that is configured for use by the resource management system 720 to generate, store, and/or otherwise provide keys for the LCS 808. However, while the resource management system 720 is described as using an EKMS it provides, one of skill in the art in possession of the present disclosure will appreciate how the resource management system 720 may use an EKMS provided by (or pointed to) by a user in order to generate, store, and/or otherwise provide keys for the LCS 708. In a related example, a tenant or other user of the LCS 808 may provide their own keys for the LCS 808 rather than use keys provided by the EKMS included on the resource management system 720. As such, as part of the configuration of the host processing system 704 to provide the LCS 808, the resource management system 720 may provide the keys associated with the LCS 808 to the LCS 808 (as well as to the SCP device 706 or the SCP device 716 in some embodiments), requiring key management functionality in the LCS 808 (as opposed to the LCS 718 discussed above that need not include such key management functionality). Furthermore, while several examples have been provided, one of skill in the art in possession of the present disclosure will appreciate how the LCS 808 may be associated with keys in a variety of manners that will fall within the scope of the present disclosure.

In an embodiment of block 902, the SCP engine in the SCP device 706 may use the keys associated with the LCS 708 provided by the connected host processing system 704 to configure a first secure communication channel with the connected host processing system 704. As will be appreciated by one of skill in the art in possession of the present disclosure, the connection discussed herein for the "connected" host processing system 704 with the SCP device 706 refers to a connection internal to the resource system 702 that, in the examples provided below, is provided by PCIe connections, but that one of skill in the art in possession of the present disclosure will appreciate may be provided by similar types of connections while remaining within the scope of the present disclosure as well.

In the specific examples provided below, the first secure communication channel configured by any of the SCP devices discussed below is provided by an Integrity and Data Encryption (IDE) communication channel. As will be appreciated by one of skill in the art in possession of the present disclosure, IDE was published in the PCIe version 6.0 specification to provide for the protection of communications between different devices in a PCIe topology root complex, switch, and endpoint, and describes an IDE layer between the transaction layer and the data link layer that uses cryptography to encrypt data transmitted over an IDE communication channel to protect against physical attacks on physical PCIe links. However, while IDE communication channels are described below, one of skill in the art in possession of the present disclosure will appreciate how other secure communication channels will fall within the scope of the present disclosure as well.

Figure 10:
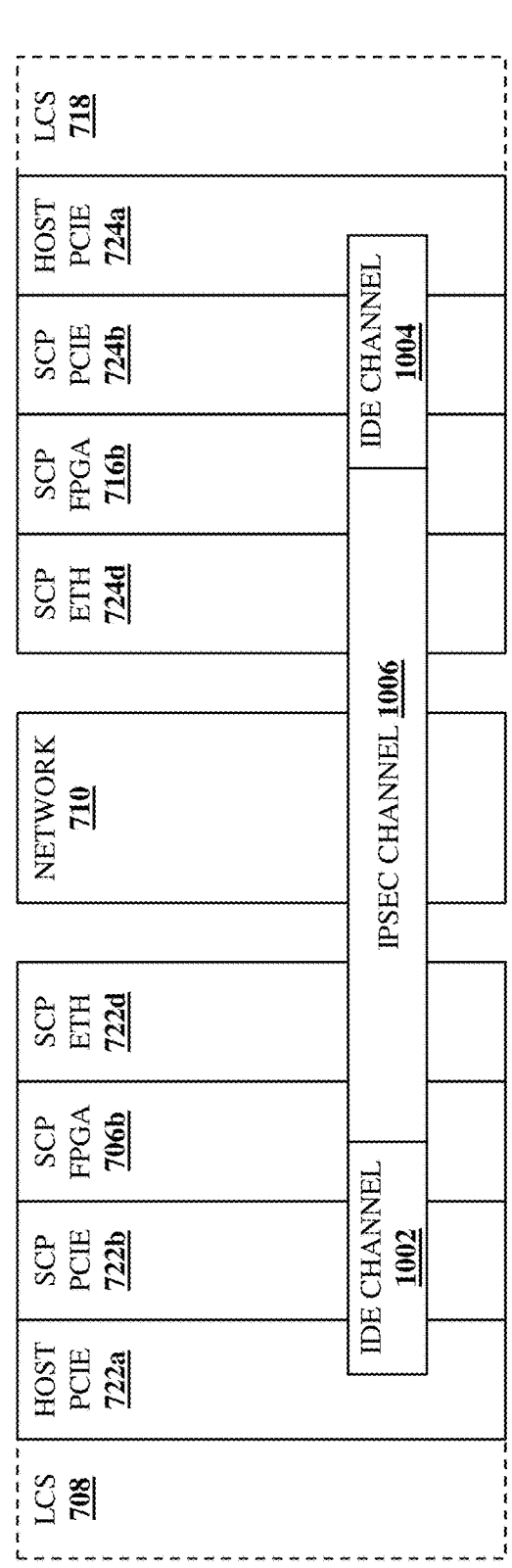
FIG. 10 is a schematic view illustrating an embodiment of secure LCS communication channels provided in the networked system of FIG. 7 during the method of FIG. 9.

With reference to FIGS. 7 and 10, in an embodiment of block 902, the SCP engine in the SCP device 706 may use keys associated with the LCS 708 (e.g., a public/private key pair for the LCS 708) to configure an IDE communication channel 1002 from the host processing system 704 and over the host/SCP connection 722*a* (e.g., a "HOST PCIE 722*a*" connection in the illustrated example) and the internal SCP connection 722*b* (e.g., an "SCP PCIE 722*b*" connection in the illustrated example) to the SCP processing system 706*b* (e.g., the "SCP FPGA 706*b*" in the illustrated example), and one of skill in the art in possession of the present disclosure will appreciate how IDE communication channel configuration techniques may be used with the keys associated with the LCS 708 to configure the IDE communication channel 1002. For example, the IDE communication channel 1002 may be configured using an IDE key negotiated by the host processing system 704 and the SCP processing system 706*b*, and may extend between a host PCIe root port on the host processing system 704 and a host-facing PCIe endpoint provided by the SCP processing system 706*b*.

Similarly, the SCP engine in the SCP device 716 may use the keys associated with the LCS 718 (e.g., a public/private key pair for the LCS 718) to configure an IDE communication channel 1004 from the host processing system 714 and over the host/SCP connection 724*a* (e.g., a "HOST PCIE 724*a*" connection in the illustrated example) and the internal SCP connection 724*b* (e.g., an "SCP PCIE 724*b*" connection in the illustrated example) to the SCP processing system 716*b* (e.g., the "SCP FPGA 704*b*" in the illustrated example), and one of skill in the art in possession of the present disclosure will appreciate how IDE communication channel configuration techniques may be used with the keys associated with the LCS 718 to configure the IDE communication channel 1004. For example, the IDE communication channel 1004 may be configured using an IDE key negotiated by the host processing system 714 and the SCP processing system 716*b*, and may extend between a host PCIe root port on the host processing system 714 and a host-facing PCIe endpoint provided by the SCP processing system 716*b*.

Figure 11:
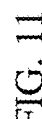
FIG. 11 is a schematic view illustrating an embodiment of secure LCS communication channels provided in the networked system of FIG. 8 during the method of FIG. 9.

With reference to FIGS. 8 and 11, in an embodiment of block 902, the SCP engine in the SCP device 706 may use the keys associated with the LCS 708 (e.g., a public/private key pair for the LCS 708) to configure an IDE communication channel 1102 from the host processing system 704 and over the host/SCP connection 722*a* (e.g., a "HOST PCIE 722*a*" connection in the illustrated example) and the internal SCP connection 722*b* (e.g., an "SCP PCIE 722*b*" connection in the illustrated example) to the SCP processing system 706*b* (e.g., the "SCP FPGA 706*b*" in the illustrated example), and one of skill in the art in possession of the present disclosure will appreciate how IDE communication channel configuration techniques may be used with the keys associated with the LCS 708 to configure the IDE communication channel 1102. For example, the IDE communication channel 1102 may be configured using an IDE key negotiated by the host processing system 704 and the SCP processing system 706*b*, and may extend between a host PCIe root port on the host processing system 704 and a host-facing PCIe endpoint provided by the SCP processing system 706*b*.

Figure 12:
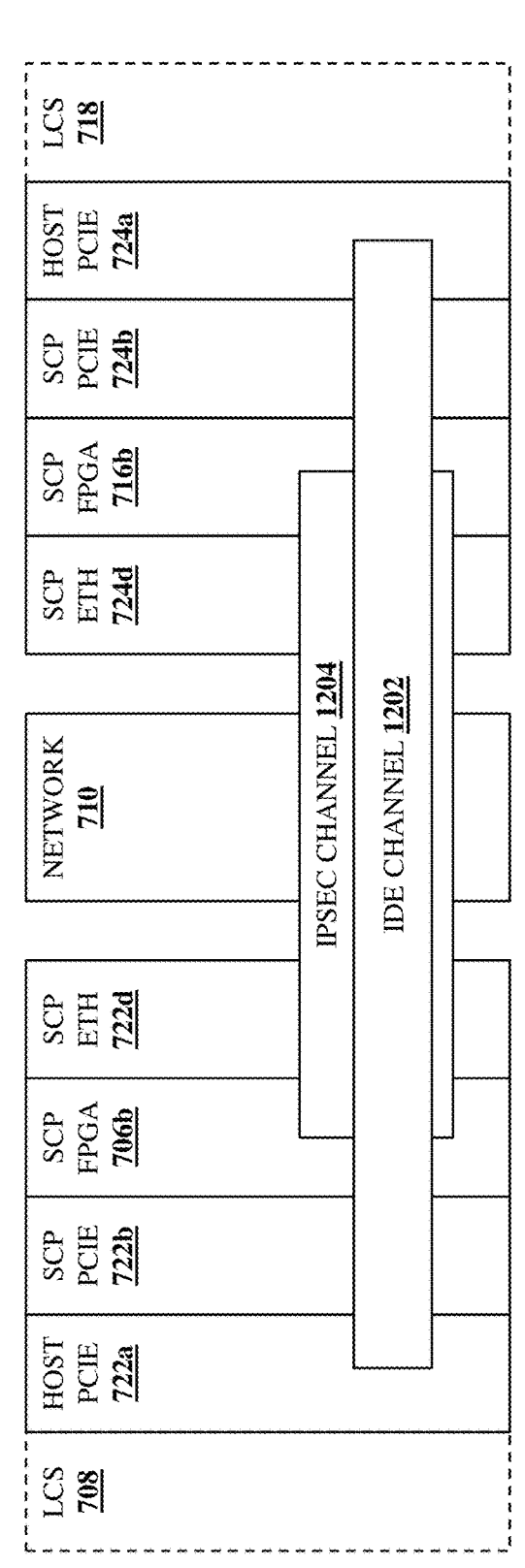
FIG. 12 is a schematic view illustrating an embodiment of secure LCS communication channels provided in the networked system of FIG. 7 during the method of FIG. 9.

With reference to FIGS. 7 and 12, in an embodiment of block 902, the SCP engine in the SCP device 706 may use the keys associated with the LCS 708 (e.g., a public/private key pair for the LCS 708) and the SCP engine in the SCP device 716 may use the keys associated with the LCS 718 (e.g., a public/private key pair for the LCS 718) to configure an IDE communication channel 1202 from the host processing system 704 and over the host/SCP connection 722*a* (e.g., a "HOST PCIE 722*a*" connection in the illustrated example) and the internal SCP connection 722*b* (e.g., an "SCP PCIE 722*b*" connection in the illustrated example) to the SCP processing system 706*b* (e.g., the "SCP FPGA 706*b*" in the illustrated example), as well as from the host processing system 714 and over the host/SCP connection 724*a* (e.g., a "HOST PCIE 724*a*" connection in the illustrated example) and the internal SCP connection 724*b* (e.g., an "SCP PCIE 724*b*" connection in the illustrated example) to the SCP processing system 716*b* (e.g., the "SCP FPGA 716*b*" in the illustrated example), and one of skill in the art in possession of the present disclosure will appreciate how IDE communication channel configuration techniques may be used with the keys associated with the LCS 708 and 718 to configure the IDE communication channel 1202. For example, the IDE communication channel 1202 may be configured using an IDE key negotiated by the host processing system 704 and the host processing system 714, and may extend between a host PCIe root port on the host processing system 704 and a host-facing PCIe endpoint provided by the host processing system 714.

As discussed in further detail below, the IDE communication channel 1202 allows for the use of IDE with LCS communications transmitted over the network 710 without the need to perform IDE decryption before transmitting over the network 710, and thus requires the sharing of the keys for each of the LCS 708 and 718 between the SCP devices 706 and 716. As such, one of skill in the art in possession of the present disclosure will appreciate how the configuration of the IDE communications channel 1202 may include any of a variety of key sharing operations that allow the IDE communication channel 1202 to "extend" between the host processing system 704 and the host processing system 714.

Figure 13:
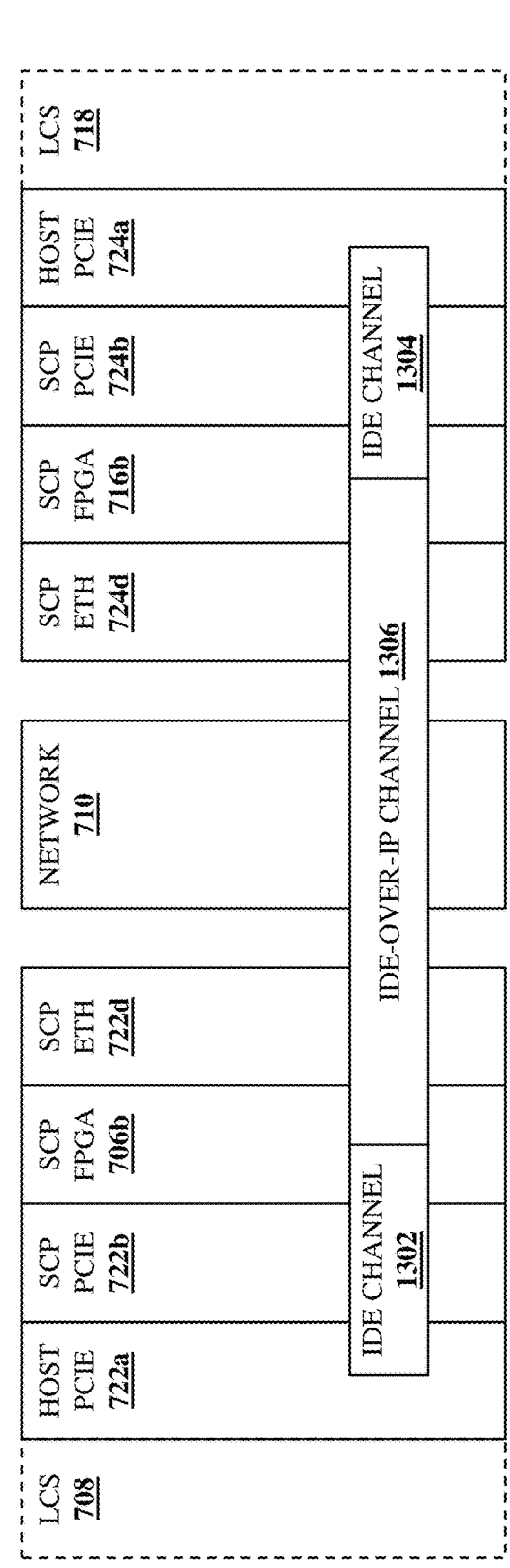
FIG. 13 is a schematic view illustrating an embodiment of secure LCS communication channels provided in the networked system of FIG. 7 during the method of FIG. 9.

With reference to FIGS. 7 and 13, in an embodiment of block 902, the SCP engine in the SCP device 706 may use the keys associated with the LCS 708 (e.g., a public/private key pair for the LCS 708) to configure an IDE communication channel 1302 from the host processing system 704 and over the host/SCP connection 722*a* (e.g., a "HOST PCIE 722*a*" connection in the illustrated example) and the internal SCP connection 722*b* (e.g., an "SCP PCIE 722*b*" connection in the illustrated example) to the SCP processing system 706*b* (e.g., the "SCP FPGA 706*b*" in the illustrated example), and one of skill in the art in possession of the present disclosure will appreciate how IDE communication channel configuration techniques may be used with the keys associated with the LCS 708 to configure the IDE communication channel 1302. For example, the IDE communication channel 1302 may be configured using an IDE key negotiated by the host processing system 704 and the SCP processing system 706*b*, and may extend between a host PCIe root port on the host processing system 704 and a host-facing PCIe endpoint provided by the SCP processing system 706*b*.

Similarly, the SCP engine in the SCP device 716 may use the keys associated with the LCS 718 (e.g., a public/private key pair for the LCS 718) to configure an IDE communication channel 1304 from the host processing system 714 and over the host/SCP connection 724*a* (e.g., a "HOST PCIE 724*a*" connection in the illustrated example) and the internal SCP connection 724*b* (e.g., an "SCP PCIE 724*b*" connection in the illustrated example) to the SCP processing system 716*b* (e.g., the "SCP FPGA 704*b*" in the illustrated example), and one of skill in the art in possession of the present disclosure will appreciate how IDE communication channel configuration techniques may be used with the keys associated with the LCS 718 to configure the IDE communication channel 1304. For example, the IDE communication channel 1304 may be configured using an IDE key negotiated by the host processing system 714 and the SCP processing system 716b, and may extend between a host PCIe root port on the host processing system 714 and a host-facing PCIe endpoint provided by the SCP processing system 716b.

The method 900 then proceeds to block 904 where the SCP device uses keys associated with the first LCS provided by the connected first host processing system and a second LCS provided by a network-coupled second host processing system to configure a second secure communication channel with the network-coupled second host processing system. In an embodiment, at block 904, the SCP engine in the SCP device 706 may use the keys associated with the LCS 708 provided by the connected host processing system 704 and the keys associated with an LCS provided by a network-coupled host processing system (e.g., the keys associated with the LCS 718 provided by the host processing system 714 in FIG. 7, or the keys associated with the LCS 808 provided by the host processing system 804 in FIG. 8) to configure a second secure communication channel with the network-coupled host processing system 714 or 804. As will be appreciated by one of skill in the art in possession of the present disclosure, the network coupling discussed herein for the "network-coupled" host processing system 714 or 804 with the SCP device 706 refers to a network connection to the resource system 702 that, in the examples provided below, is provided via the network 710, but that one of skill in the art in possession of the present disclosure will appreciate may be provided by similar types of network couplings while remaining within the scope of the present disclosure as well.

In the specific examples provided below, the second secure communication channel configured by any of the SCP devices discussed below is provided by an Internet Protocol SECurity (IPSEC) communication channel. As will be appreciated by one of skill in the art in possession of the present disclosure, IPSEC is a secure network protocol suite that authenticates and encrypts communications between devices connected via an IP network, and includes protocols for establishing mutual authentication at the beginning of a communication session, negotiation of cryptographic keys for use during the communication session, and/or other IPSEC operations known in the art. However, while IPSEC communication channels are described below, one of skill in the art in possession of the present disclosure will appreciate how other secure communication channels will fall within the scope of the present disclosure as well.

With reference to FIGS. 7 and 10, in an embodiment of block 904, the SCP engine in the SCP device 706 and the SCP engine in the SCP device 716 may negotiate an IPSEC Internet Key Exchange (IKE) key using the keys associated with each of the LCS 708 and the LCS 718 to configure an IPSEC communication channel 1006 between the SCP processing system 706b (e.g., the "SCP FPGA 706b" in the illustrated example) and the SCP processing system 716b (e.g., the "SCP FPGA 716b" in the illustrated example) and over the internal SCP connection 722c to SCP/network communication system 706c, the network connection 722d (e.g., a "SCP ETH 722d" connection in the illustrated embodiment), the network 710, the network connection 724d (e.g., a "SCP ETH 724d" connection in the illustrated embodiment), and the internal SCP connection 724c to SCP/network communication system 716c, and one of skill in the art in possession of the present disclosure will appreciate how IPSEC communication channel configuration techniques may be used with the IPSEC IKE key associated with the LCS 708 and the LCS 718 to configure the IPSEC communication channel 1006. In some embodiments, the SCP engine in each of the SCP devices 706 and 716 may map (in any accessible database) the IPSEC IKE key to their respective IDE keys that were negotiated with their respective host processing systems 704 and 714 as described above, thus making the decryption/re-encryption operations described below more efficient.

With reference to FIGS. 8 and 11, in an embodiment of block 904, the SCP engine in the SCP device 706 and the host processing system 704 may negotiate an IPSEC IKE key using the keys associated with each of the LCS 708 and the LCS 808 to configure an IPSEC communication channel 1106 between the SCP processing system 706b (e.g., the "SCP FPGA 706b" in the illustrated example) and the host processing system 804 (e.g., a HOST CPU 804 in the illustrated embodiment) and over the internal SCP connection 722c to SCP/network communication system 706c, the network connection 722d (e.g., a "SCP ETH 722d" connection in the illustrated embodiment), the network 710, and the NIC device 806 (e.g., a "NIC 806" in the illustrated embodiment), and one of skill in the art in possession of the present disclosure will appreciate how IPSEC communication channel configuration techniques may be used with the IPSEC IKE key associated with the LCS 708 and the LCS 808 to configure the IPSEC communication channel 1106. In some embodiments, the SCP engine in the SCP device 706 may map (in any accessible database) the IPSEC IKE key to its IDE key that was negotiated with its host processing system 704 as described above, thus making the decryption/re-encryption operations described below more efficient.

With reference to FIGS. 7 and 12, in an embodiment of block 904, the SCP engine in the SCP device 706 and the SCP engine in the SCP device 716 may negotiate an IPSEC IKE key using the keys associated with each of the LCS 708 and the LCS 718 to configure an IPSEC communication channel 1204 between the SCP processing system 706b (e.g., the "SCP FPGA 706b" in the illustrated example) and the SCP processing system 716b (e.g., the "SCP FPGA 716b" in the illustrated example) and over the internal SCP connection 722c to SCP/network communication system 706c, the network connection 722d (e.g., a "SCP ETH 722d" connection in the illustrated embodiment), the network 710, the network connection 724d (e.g., a "SCP ETH 724d" connection in the illustrated embodiment), and the internal SCP connection 724c to SCP/network communication system 716c, and one of skill in the art in possession of the present disclosure will appreciate how IPSEC communication channel configuration techniques may be used with the IPSEC IKE key associated with the LCS 708 and the LCS 718 to configure the IPSEC communication channel 1204.

With reference to FIGS. 7 and 13, in an embodiment of block 904, the SCP engine in the SCP device 706 and the SCP engine in the SCP device 716 may be configured to provide an IDE-OVER-IP communication channel 1306 between the SCP processing system 706b (e.g., the "SCP FPGA 706b" in the illustrated example) and the SCP processing system 716b (e.g., the "SCP FPGA 716b" in the illustrated example) and over the internal SCP connection 722c to SCP/network communication system 706c, the network connection 722d (e.g., a "SCP ETH 722d" connection in the illustrated embodiment), the network 710, the network connection 724d (e.g., a "SCP ETH 724d" connection in the illustrated embodiment), and the internal SCP connection 724c to SCP/network communication system 716c. As discussed in further detail below, this embodiment of the present disclosure extends IDE to support transmission over an IP network by adding an IP header to communications transmitted via the IDE communication channels 1302 and 1304, and one of skill in the art in possession of the present disclosure will appreciate how the configuration of the IDE-OVER-IP communication channel 1306 requires coordination of the SCP processing systems 706a and 716a in the SCP devices 706 and 716, respectively, the sharing of IDE keys associated with the LCS 708 and the LCS 718, and/or other operations that one of skill in the art in possession of the present disclosure would recognize as enabling the functionality described below.

The method 900 then proceeds to decision block 906 where the method 900 proceeds depending on whether a communication from the first LCS to the second LCS is received via the first secure communication channel. As will be appreciated by one of skill in the art in possession of the present disclosure, a tenant or other user may utilize multiple LCSs provided via the LCS provisioning system described above, and those LCSs may communicate with each other for a variety of reasons known in the art. In the embodiment of decision block 906 illustrated and described below, the LCS 708 transmits communications to the LCS 718 and the LCS 808, but one of skill in the art in possession of the present disclosure will appreciate how either of the LCSs 718 and/or 808 may transmit communications to the LCS 708 in a similar manner while remaining within the scope of the present disclosure. If, at decision block 906, no communication from the first LCS to the second LCS is received by the SCP engine provided by the SCP processing system 706b in the SCP device 706 via the first secure communication channel, the method 900 returns to block 904. As such, the method 900 may loop until the SCP engine receives a communication from the LCS 708 via the first secure communication channel.

If, at decision block 906, a communication is received from the first LCS to the second LCS via the first secure communication channel, the method 900 proceeds to block 908 where the SCP device transmit the communication to the second LCS via the second secure communication channel. With reference to FIGS. 14, 15, 16, and 17, in an embodiment of decision block 906, the LCS 708 may perform communication transmission operations 1400 that may include transmission any of a variety of communications that would be apparent to one of skill in the art in possession of the present disclosure, and those communications will be received by the host processing system 704. In response to receiving the communication, the host processing system 704 may perform encrypted communication transmission operations 1402 that include encrypting the communication received from the LCS 708 to provide an encrypted communication, and transmitting that encrypted communication over the first secure communication channel that was provided between the host processing system 704 and the SCP processing system 706b at block 902 and via the host/SCP connection 722a, the SCP/host communication system 706a, and the internal SCP connection 722b such that the encrypted communication is received by the SCP engine provided by the SCP processing system 706b.

Continuing with the examples provided above with reference to FIGS. 10, 11, 12, and 13, the encrypted communication transmission operations 1402 may include the host processing system 704 using IDE encryption techniques to encrypt (e.g., using the negotiated IDE key discussed above) the communication received from the LCS 708 to provide an IDE encrypted communication (also referred to as a "first IDE encrypted communication" in some of the embodiments described below), and transmitting that IDE encrypted communication over the IDE communication channel 1002, 1102, 1202, or 1302 and via the "HOST PCIE 722a"

connection, the SCP/host communication system 706a, and the "SCP PCIE 722b" connection such that the first IDE encrypted communication is received by the "SCP FPGA 706b".

Figure 14:
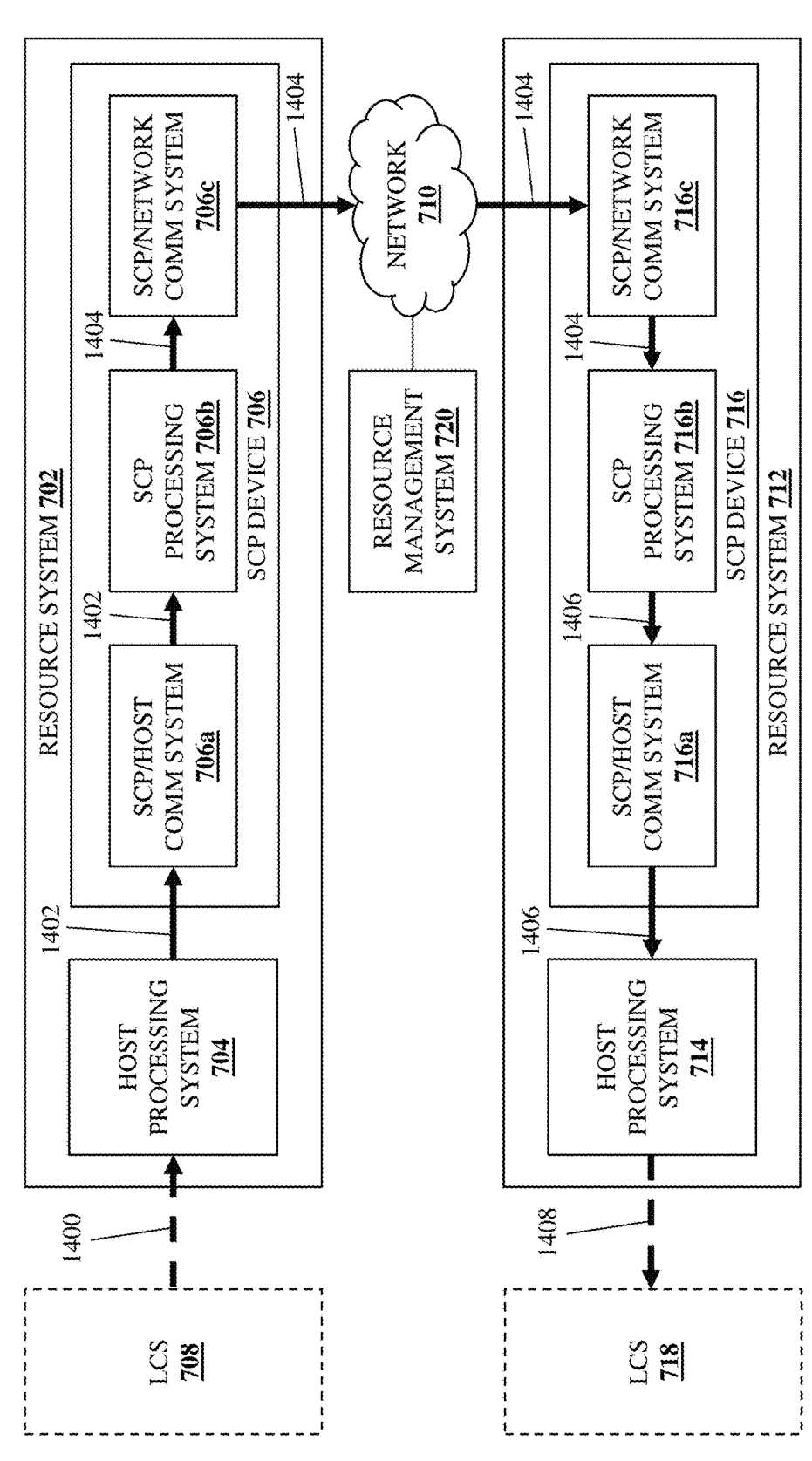
FIG. 14 is a schematic view illustrating an embodiment of the networked system of FIG. 7 operating during the method of FIG. 9.

With reference to FIGS. 10 and 14, in an embodiment of block 908 and in response to receiving the encrypted communication via the first secure communication channel at decision block 906, the SCP processing system 706b may perform encrypted communication transmission operations 1404 that include decrypting the encrypted communication received from the host processing system 704 to provide a first decrypted communication, re-encrypting the first decrypted communication to provide a first re-encrypted communication, and transmitting that first re-encrypted communication over the second secure communication channel and via the internal SCP connection 722c, the SCP/network communication system 706c, the SCP/network connection 722d, the network 710, the SCP/network connection 724d, the SCP/network communication system 716c, and the internal SCP connection 724c such that the first re-encrypted communication is received by the SCP engine provided by the SCP processing system 716b.

Continuing with the example provided above with reference to FIG. 10, the re-encrypted communication transmission operations 1404 may include the "SCP FPGA 706b" using IDE decryption techniques to decrypt (e.g., using the negotiated IDE key discussed above) the first IDE encrypted communication received from the host processing system 704 to provide the communication that was transmitted by the LCS 708, using IPSEC encryption techniques to re-encrypt (e.g., using the negotiated IPSEC IKE key discussed above) that communication and provide an IPSEC encrypted communication, and transmitting that IPSEC encrypted communication over the IPSEC communication channel 1006 and via the internal SCP connection 722c, the SCP/network communication system 706c, the "SCP ETH 722d" connection, the network 710, the "SCP ETH 724d" connection, the SCP/network communication system 716c, and the internal SCP connection 724c such that the IPSEC encrypted communication is received by the "SCP FPGA 716b". As such, in this embodiment the "SCP FPGA 706b" and the "SCP FPGA 716b" may operate as IPSEC endpoints.

In response to receiving the first re-encrypted communication via the second secure communication channel, the SCP processing system 716b may perform encrypted communication transmission operations 1406 that include decrypting the first re-encrypted communication received from the SCP processing system 706b to provide a second decrypted communication, re-encrypting that second decrypted communication to provide a second re-encrypted communication, and transmitting that second re-encrypted communication over the first secure communication channel that was provided between the host processing system 714 and the SCP processing system 716b at block 902 and via the internal SCP connection 724b, the SCP/host communication system 716a, and the SCP/host connection 724a such that the second re-encrypted communication is received by the host processing system 714.

Continuing with the example provided above with reference to FIG. 10, the encrypted communication transmission operations 1406 may include the "SCP FPGA 716b" using IPSEC decryption techniques to decrypt (e.g., using the negotiated IPSEC IKE key discussed above) the IPSEC encrypted communication received from the "SCP FPGA 706b" to provide the communication that was transmitted by the LCS 708, re-encrypting (e.g., using the negotiated IDE key discussed above) that communication using IDE encryption techniques to provide a second IDE encrypted communication, and transmitting that second IDE encrypted communication over the IDE communication channel 1004 and via the "SCP PCIE 724*b*" connection, the SCP/host communication system 716*a*, and the "HOST PCIE 724*a*" connection such that the second IDE encrypted communication is received by the host processing system 714.

In response to receiving the second re-encrypted communication over the first secure communication channel that was provided between the host processing system 714 and the SCP processing system 716*b* at block 902, the host processing system 714 may perform communication transmission operations 1408 that include decrypting the second re-encrypted communication to provide a third decrypted communication, and transmitting that third decrypted communication to the LCS 718. Continuing with the example provided above with reference to FIG. 10, the communication transmission operations 1408 may include the host processing system 714 using IDE decryption techniques to decrypt (e.g., using the negotiated IDE key discussed above) the second IDE encrypted communication received via the IDE communication channel 1004 to provide the communication that was transmitted by the LCS 708, and transmitting that communication to the LCS 718.

As such, the embodiment of FIG. 10 provides for a first encryption (e.g., first IDE encryption) of communications from the LCS 708 that are transmitted between the host processing system 704 and the SCP processing system 706*b*, a second encryption (e.g., IPSEC encryption following decryption of the first IDE encryption) of the communications from the LCS 708 that are transmitted by the SCP processing system 706*b* to the SCP processing system 716*b* via the network 710, and a third encryption (e.g., second IDE encryption following decryption of the IPSEC encryption) of the communications from the LCS 708 that are transmitted between the SCP processing system 716*b* and the host processing system 714, with the host processing system 714 providing the communication from the LCS 708 to the LCS 718 (e.g., following decryption of the second IDE encryption).

As will be appreciated by one of skill in the art in possession of the present disclosure, the embodiment of FIG. 10 provides a flexible and granular solution that reduces the need for coordination between the resource systems, but at the expense of the need to decrypt LCS communications (e.g., PCIe data transmitted internally in the resource system) in the SCP devices before re-encrypting those LCS communications (e.g., with an IPSEC Internet Key Exchange (IKE) key) for transmission via the network, and the need decrypt LCS communications (e.g., Ethernet data transmitted by the resource systems via the network) in the SCP devices before re-encrypting those LCS communications (e.g., with an IDE key) for transmission internally in the resource system, thus requiring enhanced security in the SCP device to ensure the security of the unencrypted data.

Figure 15:
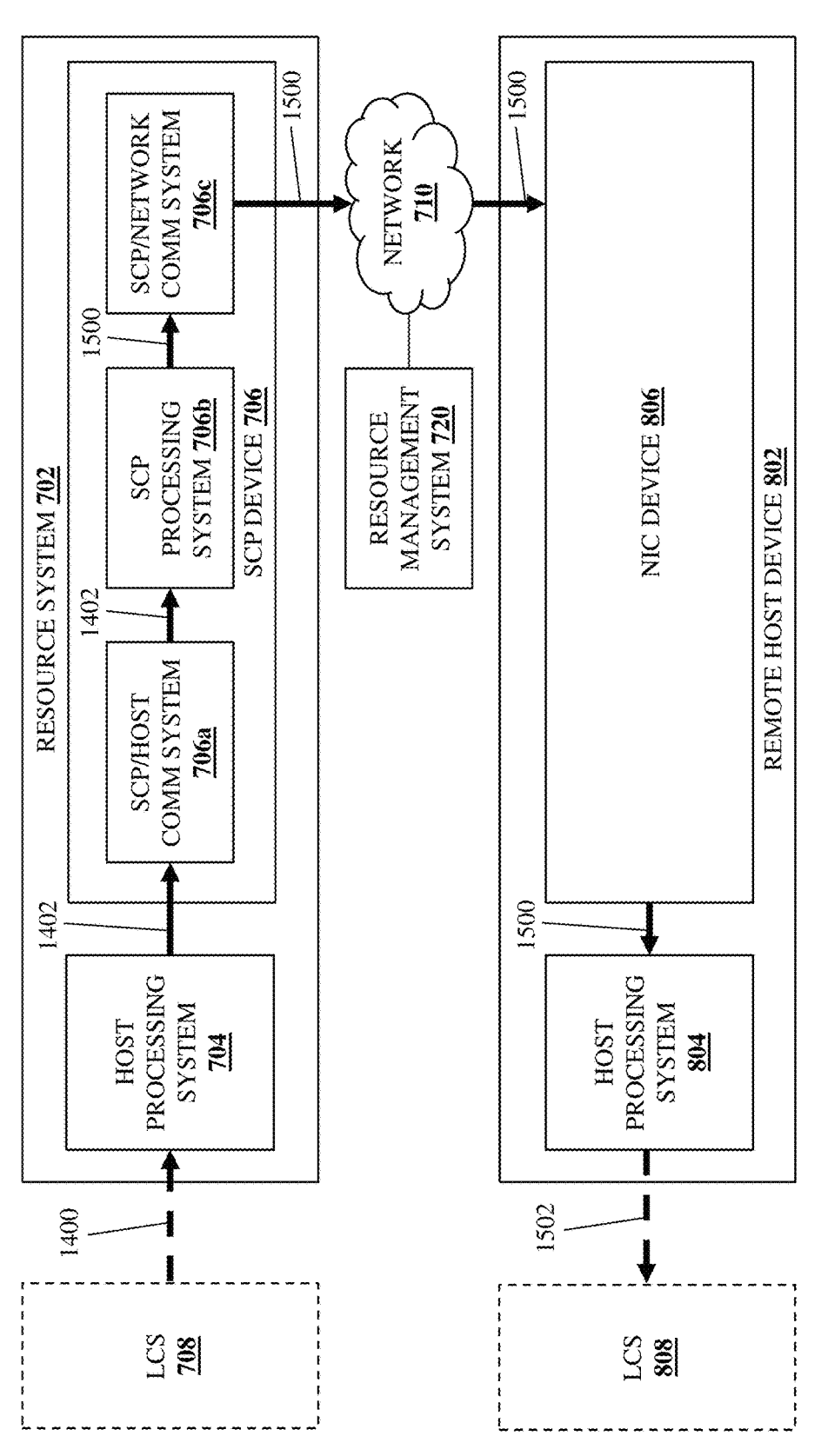
FIG. 15 is a schematic view illustrating an embodiment of the networked system of FIG. 8 operating during the method of FIG. 9.

With reference to FIGS. 11 and 15, in an embodiment of block 908 and in response to receiving the encrypted communication via the first secure communication channel at decision block 906, the SCP processing system 706*b* may perform encrypted communication transmission operations 1500 that include decrypting the encrypted communication received from the host processing system 704 to provide a first decrypted communication, re-encrypting the first decrypted communication to provide a re-encrypted communication, and transmitting that re-encrypted communication over the second secure communication channel and via the internal SCP connection 722*c*, the SCP/network communication system 706*c*, the SCP/network connection 722*d*, the network 710, and the NIC device 806 such that the re-encrypted communication is received by the host processing system 804.

Continuing with the example provided above with reference to FIG. 11, the re-encrypted communication transmission operations 1500 may include the "SCP FPGA 706*b*" using IDE decryption techniques to decrypt (e.g., using the negotiated IDE key discussed above) the IDE encrypted communication received from the host processing system 704 to provide the communication that was transmitted by the LCS 708, using IPSEC encryption techniques to re-encrypt (e.g., using the negotiated IPSEC IKE key discussed above) that communication and provide an IPSEC encrypted communication, and transmitting that IPSEC encrypted communication over the IPSEC communication channel 1106 and via the internal SCP connection 722*c*, the SCP/network communication system 706*c*, the "SCP ETH 722*d*" connection, the network 710, and the "NIC 806" such that the IPSEC encrypted communication is received by the "HOST CPU 804". As such, in this embodiment the "SCP FPGA 706*b*" and the "HOST CPU 804" may operate as IPSEC endpoints.

In response to receiving the re-encrypted communication over the second secure communication channel, the host processing system 804 may perform communication transmission operations 1502 that include decrypting the re-encrypted communication to provide a second decrypted communication, and transmitting the second decrypted communication to the LCS 718. Continuing with the example provided above with reference to FIG. 11, the communication transmission operations 1502 may include the "HOST CPU 804" using IPSEC decryption techniques to decrypt (e.g., using the negotiated IPSEC IKE key discussed above) the IPSEC encrypted communication received via the IPSEC communication channel 1106 to provide the communication that was transmitted by the LCS 708, and transmitting that communication to the LCS 808.

As such, the embodiment of FIG. 11 provides for a first encryption (e.g., IDE encryption) of communications from the LCS 708 that are transmitted between the host processing system 704 and the SCP processing system 706*b*, and a second encryption (e.g., IPSEC encryption following decryption of the IDE encryption) of the communications from the LCS 708 that are transmitted by the SCP processing system 706*b* to the host processing system 804 via the network 710, with the "HOST CPU 804" providing the communication from the LCS 708 to the LCS 808 (e.g., following decryption of the IPSEC encryption). As will be appreciated by one of skill in the art in possession of the present disclosure, the embodiment of FIG. 11 allows the resource systems including the SCP devices discussed above to provide some of the secure LCS communication benefits of the present disclosure when connected to remote host devices that do not include such SCP devices (or SCP functionality).

Figure 16:
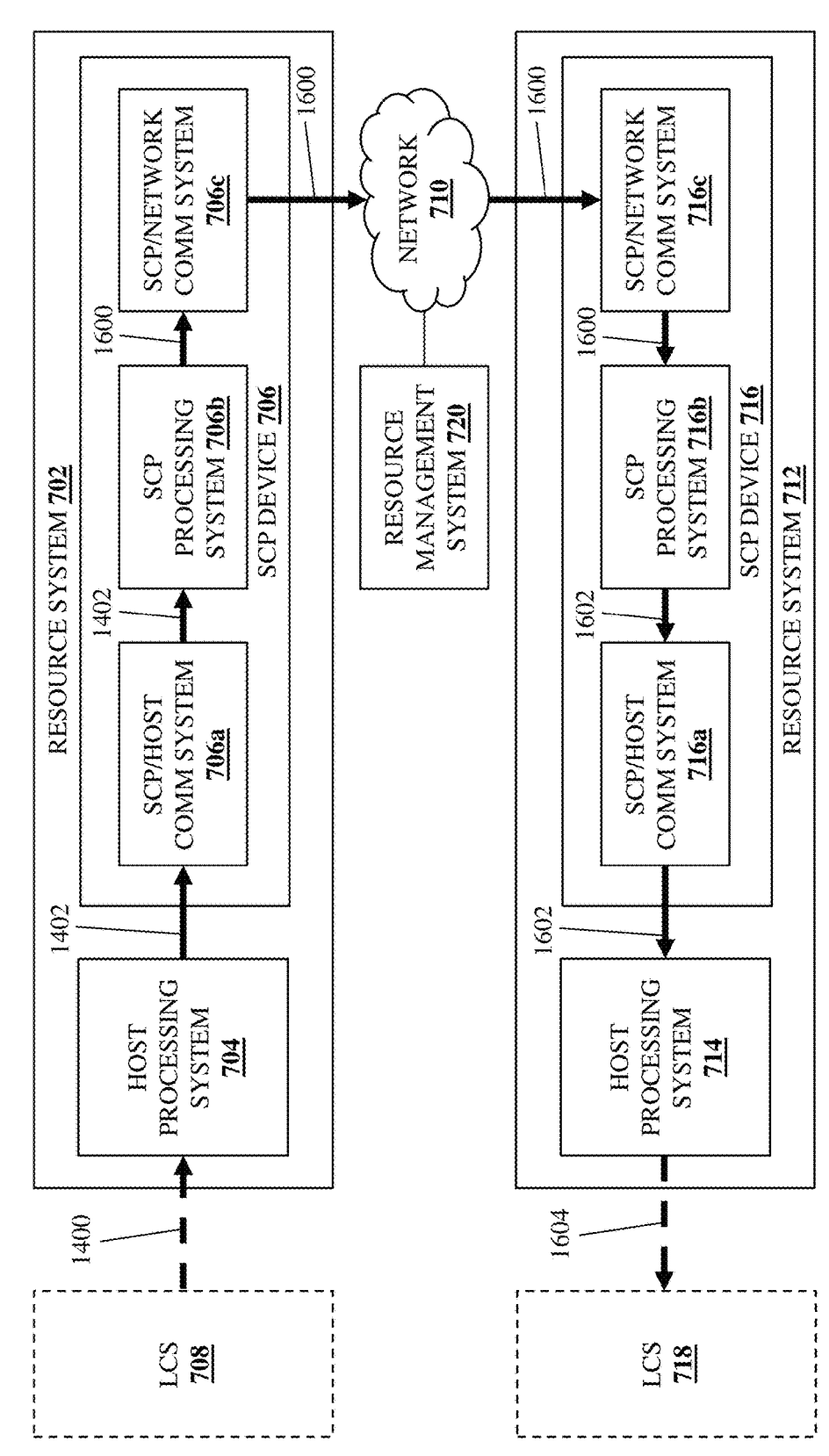
FIG. 16 is a schematic view illustrating an embodiment of the networked system of FIG. 7 operating during the method of FIG. 9.

With reference to FIGS. 12 and 16, in an embodiment of block 908 and in response to receiving the encrypted communication via the first secure communication channel at decision block 906, the SCP processing system 706*b* may perform encrypted-encrypted communication transmission operations 1600 that include encrypting the encrypted communication received from the host processing system 704 to provide an encrypted-encrypted communication, and transmitting that encrypted-encrypted communication over the second secure communication channel and via the internal SCP connection 722*c*, the SCP/network communication system 706*c*, the SCP/network connection 722*d*, the network 710, the SCP/network connection 724*d*, the SCP/ network communication system 716*c*, and the internal SCP connection 724*c* such that the encrypted-encrypted communication is received by the SCP engine provided by the SCP processing system 716*b*.

Continuing with the example provided above with reference to FIG. 12, the encrypted-encrypted communication transmission operations 1600 may include the "SCP FPGA 706*b*" using IPSEC encryption techniques to encrypt (e.g., using the negotiated IPSEC IKE key discussed above) the first IDE encrypted communication received from the host processing system 704 and provide an IPSEC encrypted-IDE encrypted communication (i.e., a communication with IPSEC encryption layered on top of IDE encryption), and transmitting that IPSEC encrypted-IDE encrypted communication over the IDE communication channel 1202 within the IPSEC communication channel 1204 (i.e., transmitting the IDE encrypted communication in an IPSEC "tunnel") and via the internal SCP connection 722*c*, the SCP/network communication system 706*c*, the "SCP ETH 722*d*" connection, the network 710, the "SCP ETH 724*d*" connection, the SCP/network communication system 716*c*, and the internal SCP connection 724*c* such that the IPSEC encrypted-IDE encrypted communication is received by the "SCP FPGA 716*b*".

In response to receiving the encrypted-encrypted communication via the second secure communication channel, the SCP processing system 716*b* may perform encrypted communication transmission operations 1602 that include decrypting the encrypted-encrypted communication received from the SCP processing system 706*b* to provide a decrypted-encrypted communication, and transmitting that decrypted-encrypted communication over the first secure communication channel that was provided between the host processing system 714 and the SCP processing system 716*b* at block 902 and via the internal SCP connection 724*b*, the SCP/host communication system 716*a*, and the SCP/host connection 724*a* such that the decrypted-encrypted communication is received by the host processing system 714.

Continuing with the example provided above with reference to FIG. 12, the encrypted communication transmission operations 1602 may include the "SCP FPGA 716*b*" using IPSEC decryption techniques to decrypt (e.g., using the negotiated IPSEC IKE key discussed above) the IPSEC encrypted-IDE encrypted communication received from the "SCP FPGA 706*b*" to provide the first IDE encrypted communication, and transmitting that first IDE encrypted communication over the IDE communication channel 1202 and via the "SCP PCIE 724*b*" connection, the SCP/host communication system 716*a*, and the "HOST PCIE 724*a*" connection such that the first IDE encrypted communication is received by the host processing system 714.

In response to receiving the first IDE encrypted communication over the first secure communication channel that was provided between the host processing system 714 and the SCP processing system 716*b* at block 902, the host processing system 714 may perform communication transmission operations 1604 that include decrypting the decrypted-encrypted communication to provide a decrypted communication, and transmitting that decrypted communication to the LCS 718. Continuing with the example provided above with reference to FIG. 12, the communication transmission operations 1604 may include the host processing system 714 using IDE decryption techniques to decrypt (e.g., using the negotiated IDE key discussed above) the first IDE encrypted communication received via the IDE communication channel 1202 to provide the communication that was transmitted by the LCS 708, and transmitting that communication to the LCS 718.

As such, the embodiment of FIG. 12 provides for a first encryption (e.g., IDE encryption) of communications from the LCS 708 that are transmitted between the host processing system 704 and the SCP processing system 706*b*, and a second encryption (e.g., IPSEC encryption on top of the IDE encryption) of the communications from the LCS 708 that are transmitted by the SCP processing system 706*b* to the SCP processing system 716*b* via the network 710, with the SCP processing system 716*b* providing the communication from the LCS 708 to the host processing system 714 (e.g., following decryption of the IPSEC encryption), and with the host processing system 714 providing the communication from the LCS 708 to the LCS 718 (e.g., following decryption of the IDE encryption).

As will be appreciated by one of skill in the art in possession of the present disclosure, the embodiment of FIG. 12 eliminates the decryption of data in the SCP devices that occurs in the embodiment of FIG. 10, but at the expense of the performing relatively inefficient "double encryption", and requiring the synchronization of keys (e.g., the IDE keys discussed above) between the SCP devices in the different resource systems.

Figure 17:
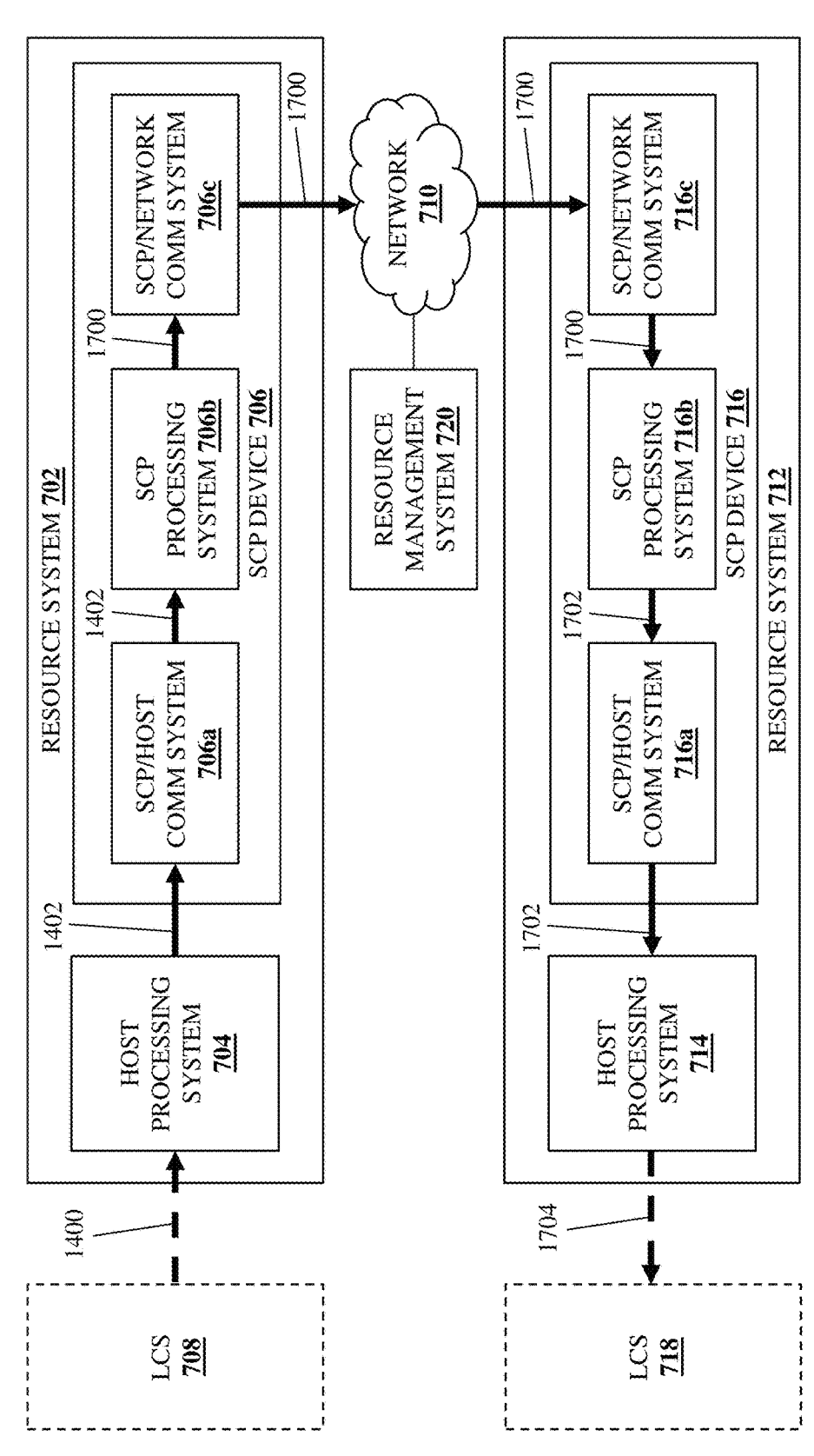
FIG. 17 is a schematic view illustrating an embodiment of the networked system of FIG. 7 operating during the method of FIG. 9.

With reference to FIGS. 13 and 17, in an embodiment of block 908 and in response to receiving the encrypted communication via the first secure communication channel at decision block 906, the SCP processing system 706*b* may perform encrypted communication transmission operations 1700 that include modifying the encrypted communication received from the host processing system 704 to provide a modified encrypted communication, and transmitting that modified encrypted communication over the second secure communication channel and via the internal SCP connection 722*c*, the SCP/network communication system 706*c*, the SCP/network connection 722*d*, the network 710, the SCP/ network connection 724*d*, the SCP/network communication system 716*c*, and the internal SCP connection 724*c* such that the modified encrypted communication is received by the SCP engine provided by the SCP processing system 716*b*.

Continuing with the example provided above with reference to FIG. 13, the encrypted communication transmission operations 1700 may include the "SCP FPGA 706*b*" modifying the IDE encrypted communication received from the host processing system 704 to provide an IDE-over-IP encrypted communication by adding an IP header and/or other information to the IDE encrypted communication that one of skill in the art in possession of the present disclosure will recognize allows the IDE encrypted communication to be transmitted via an IP network, and transmitting that IDE-over-IP encrypted communication over the IDE-OVER-IP communication channel 1306 and via the internal SCP connection 722*c*, the SCP/network communication system 706*c*, the "SCP ETH 722*d*" connection, the network 710, the "SCP ETH 724*d*" connection, the SCP/network communication system 716*c*, and the internal SCP connection 724*c* such that the IDE-over-IP encrypted communication is received by the "SCP FPGA 716*b*".

In response to receiving the modified encrypted communication via the second secure communication channel, the SCP processing system 716*b* may perform encrypted communication transmission operations 1702 that include un-modifying the modified encrypted communication received from the SCP processing system 706*b* to provide the encrypted communication, and transmitting that encrypted communication over the first secure communication channel that was provided between the host processing system 714 and the SCP processing system 716*b* at block 902 and via the internal SCP connection 724*b*, the SCP/host communication system 716*a*, and the SCP/host connection 724*a* such that the encrypted communication is received by the host processing system 714.

Continuing with the example provided above with reference to FIG. 10, the encrypted communication transmission operations 1702 may include the "SCP FPGA 716*b*" removing the IP header and/or other information from IDE-over-IP encrypted communication in order to provide the IDE encrypted communication, and transmitting that IDE encrypted communication over the IDE communication channel 1304 and via the "SCP PCIE 724*b*" connection, the SCP/host communication system 716*a*, and the "HOST PCIE 724*a*" connection such that the first IDE encrypted communication is received by the host processing system 714.

In response to receiving the encrypted communication over the first secure communication channel that was provided between the host processing system 714 and the SCP processing system 716*b* at block 902, the host processing system 714 may perform communication transmission operations 1704 that include decrypting the encrypted communication to provide a decrypted communication, and transmitting that decrypted communication to the LCS 718. Continuing with the example provided above with reference to FIG. 13, the communication transmission operations 1704 may include the host processing system 714 using IDE decryption techniques to decrypt (e.g., using the negotiated IDE key discussed above) the IDE encrypted communication received via the IDE communication channel 1304 to provide the communication that was transmitted by the LCS 708, and transmitting that communication to the LCS 718.

As such, the embodiment of FIG. 13 provides for an encryption (e.g., IDE encryption) of communications from the LCS 708 that are transmitted between the host processing system 704 and the SCP processing system 706*b*, modification of those encrypted communication to provide modified encrypted communications that are transmitted by the SCP processing system 706*b* to the SCP processing system 716*b* via the network 710, and an un-modification of those modified encrypted communications to allow them to be transmitted to the host processing system 714, with the host processing system 714 providing the communication from the LCS 708 to the LCS 718 (e.g., following decryption of the IDE encryption).

As will be appreciated by one of skill in the art in possession of the present disclosure, the embodiment of FIG. 13 utilizes a single encryption scheme that may enabled at the root port of the host processing systems that provide the LCSs and that eliminates the decryption of data in the SCP devices that occurs in the embodiment of FIG. 10, but at the expense of requiring the tenant or other user of those LCSs to utilize a common negotiated key for PCIe functions they use with those LCSs.

Thus, systems and methods have been described that provide for the configuration of respective secure communication channels between an SCP device and each of a connected first host processing system that provides a first LCS and a network-coupled second host processing system that provides a second LCS. For example, the secure LCS communication system of the present disclosure may include a first host processing system that is configured to provide a first LCS, a second host processing system that is configured to provide a second LCS, and an SCP device that is connected to the first host processing system and that is coupled to the second host processing system via a network. The SCP device uses first keys associated with the first LCS to configure a first secure communication channel with the first host processing system, and uses second keys associated with the first LCS and the second LCS to configure a second secure communication channel with the second host processing system via the network. When the SCP device receives a communication from the first LCS via the first secure communication channel that is directed to the second LCS, it transmits the communication via the second secure communication channel to the second LCS. As such, secure LCS communications are enabled between the respective LCSs provided by the connected first host processing system and the network-coupled second host processing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure Logically Composed System (LCS) communication system, comprising:
   a first host processing system that is configured to provide a first Logically Composed System (LCS);
   a second host processing system that is configured to provide a second LCS; and
   a first System Control Processor (SCP) device that is connected to the first host processing system, that is coupled to the second host processing system via a network, and that is configured to:
      configure, using first keys associated with the first LCS, a first secure communication channel with the first host processing system;
      configure, using second keys associated with the first LCS and the second LCS, a second secure communication channel with the second host processing system via the network;
      receive, from the first LCS via the first secure communication channel, a communication directed to the second LCS; and
      transmit the communication via the second secure communication channel to the second LCS.

2. The system of claim 1, wherein the first secure communication channel is an Integrity and Data Encryption (IDE) communication channel, and the second secure communication channel is an Internet Protocol SECurity (IP-SEC) communication channel.

3. The system of claim 1, wherein the first secure communication channel is configured between the first host processing system and an SCP processing system in the SCP device, and wherein the second secure communication channel is configured between the SCP processing system and a network-connected processing system that is coupled to the network.

4. The system of claim 1, wherein the first SCP device is configured to:
   map, in a database that is accessible to the first SCP device, the first keys to the second keys.

5. The system of claim 1, wherein the receiving the communication via the first secure communication channel from the first LCS and the transmitting the communication via second secure communication channel to the second LCS includes:

receiving, from the first host processing system via the first secure communication channel, the communication that is encrypted with first encryption;

decrypting the communication that is encrypted with first encryption;

re-encrypting the communication using second encryption; and transmitting the communication that is encrypted with the second encryption via the second secure communication channel.

6. The system of claim 1, wherein the receiving the communication via the first secure communication channel from the first LCS and the transmitting the communication via second secure communication channel to the second LCS includes:

receiving, from the first host processing system via the first secure communication channel, the communication that is encrypted with first encryption;

encrypting the communication that is encrypted with the first encryption using second encryption; and transmitting the communication that is encrypted with the first encryption and the second encryption via the second secure communication channel.

7. The system of claim 1, further comprising:

a second SCP device that is connected to the second host processing system, that is coupled to the first SCP device via the network, and that is configured to:

configure, using third keys for the second LCS, a third secure communication channel with the second host processing system;

configure, using the second keys for the first LCS/ second LCS combination, the second secure communication channel with the first SCP device via the network;

receive, from the first SCP device via the second secure communication channel, the communication directed to the second LCS; and transmit the communication via the third communication channel to the second LCS.

8. An Information Handling System (IHS), comprising:

a System Control Processor (SCP) processing system; and an SCP memory system that is coupled to the SCP processing system and that includes instructions that, when executed by the SCP processing system, cause the SCP processing system to provide an SCP engine that is configured to:

configure, using first keys associated with a first LCS that is provided by a first host processing system connected to the SCP processing system, a first secure communication channel with the first host processing system;

configure, using second keys associated with the first LCS and a second LCS that is provided by a second host processing system coupled to the SCP processing system via a network, a second secure communication channel with the second host processing system via the network;

receive, from the first LCS via the first secure communication channel, a communication directed to the second LCS; and transmit the communication via the second secure communication channel to the second LCS.

9. The IHS of claim 8, wherein the first secure communication channel is an Integrity and Data Encryption (IDE) communication channel, and the second secure communication channel is an Internet Protocol SECurity (IPSEC) communication channel.

10. The IHS of claim 8, wherein the first secure communication channel is configured between the host processing system and the SCP processing system, and wherein the second secure communication channel is configured between the SCP processing system and a network-connected processing system that is coupled to the network.

11. The IHS of claim 8, wherein the SCP engine is configured to:

map, in a database that is accessible to the SCP engine, the first keys to the second keys.

12. The IHS of claim 8, wherein the receiving the communication via the first secure communication channel from the first LCS and the transmitting the communication via second secure communication channel to the second LCS includes:

receiving, from the first host processing system via the first secure communication channel, the communication that is encrypted with first encryption;

decrypting the communication that is encrypted with first encryption;

re-encrypting the communication using second encryption; and transmitting the communication that is encrypted with the second encryption via the second secure communication channel.

13. The IHS of claim 8, wherein the receiving the communication via the first secure communication channel from the first LCS and the transmitting the communication via second secure communication channel to the second LCS includes:

receiving, from the first host processing system via the first secure communication channel, the communication that is encrypted with first encryption;

encrypting the communication that is encrypted with the first encryption using second encryption; and transmitting the communication that is encrypted with the first encryption and the second encryption via the second secure communication channel.

14. A method for providing secure Logically Composed System (LCS) communications, comprising:

configuring, by a first System Control Processor (SCP) device using first keys associated with a first LCS that is provided by a first host processing system connected to the first SCP device, a first secure communication channel with the first host processing system;

configuring, by the first SCP device using second keys associated with the first LCS and a second LCS that is provided by a second host processing system coupled to the first SCP device via a network, a second secure communication channel with the second host processing system via the network;

receiving, by the first SCP device from the first LCS via the first secure communication channel, a communication directed to the second LCS; and transmitting, by the first SCP device, the communication via the second secure communication channel to the second LCS.

15. The method of claim 14, wherein the first secure communication channel is an Integrity and Data Encryption (IDE) communication channel, and the second secure communication channel is an Internet Protocol SECurity (IP-SEC) communication channel.

16. The method of claim 14, wherein the first secure communication channel is configured between the host processing system and the SCP device, and wherein the second secure communication channel is configured between the SCP device and a network-connected processing system that is coupled to the network.

17. The method of claim 14, further comprising:

mapping, by the SCP device in a database that is accessible to the SCP device, the first keys to the second keys.

18. The method of claim 14, wherein the receiving the communication via the first secure communication channel from the first LCS and the transmitting the communication via second secure communication channel to the second LCS includes:

receiving, by the first SCP device from the first host processing system via the first secure communication channel, the communication that is encrypted with first encryption;

decrypting, by the first SCP device, the communication that is encrypted with first encryption;

re-encrypting, by the first SCP device, the communication using second encryption; and transmitting, by the first SCP device, the communication that is encrypted with the second encryption via the second secure communication channel.

19. The method of claim 14, wherein the receiving the communication via the first secure communication channel from the first LCS and the transmitting the communication via second secure communication channel to the second LCS includes:

receiving, by the first SCP device from the first host processing system via the first secure communication channel, the communication that is encrypted with first encryption;

encrypting, by the first SCP device, the communication that is encrypted with the first encryption using second encryption; and transmitting, by the first SCP device, the communication that is encrypted with the first encryption and the second encryption via the second secure communication channel.

20. The method of claim 14, further comprising:

configuring, by a second SCP device that is connected to the second host processing system and that is coupled to the first SCP device via the network, a third secure communication channel with the second host processing system using third keys for the second LCS;

configuring, by the second SCP device using the second keys for the first LCS/second LCS combination, the second secure communication channel with the first SCP device via the network;

receiving, by the second SCP device from the first SCP device via the second secure communication channel, the communication directed to the second LCS; and transmitting, by the second SCP device, the communication via the third communication channel to the second LCS.

* * * * *